United States Patent
Shimaya

(10) Patent No.: US 8,675,042 B2
(45) Date of Patent: Mar. 18, 2014

(54) IMAGE PROCESSING APPARATUS, MULTI-EYE DIGITAL CAMERA, AND PROGRAM

(75) Inventor: Hiroshi Shimaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 13/073,435

(22) Filed: Mar. 28, 2011

(65) Prior Publication Data

US 2011/0242273 A1 Oct. 6, 2011

(30) Foreign Application Priority Data

Mar. 30, 2010 (JP) ................................. 2010-079514
Dec. 21, 2010 (JP) ................................. 2010-285026

(51) Int. Cl.
*H04N 7/00* (2011.01)

(52) U.S. Cl.
USPC .................. 348/36; 348/42; 348/43; 348/44; 348/45; 348/46; 348/47; 348/48; 348/49; 348/50; 348/51; 348/52; 348/53; 348/54; 348/55; 348/56; 348/57; 348/58; 348/59; 348/60

(58) Field of Classification Search
USPC ................................. 348/36, 42–60; 345/419
See application file for complete search history.

(56) References Cited

U.S. PATENT DOCUMENTS

| 6,507,359 | B1 * | 1/2003 | Muramoto et al. | 348/47 |
| 6,677,982 | B1 * | 1/2004 | Chen et al. | 348/36 |
| 2008/0112616 | A1 * | 5/2008 | Koo et al. | 348/46 |
| 2011/0292045 | A1 * | 12/2011 | Nakamura et al. | 345/419 |

FOREIGN PATENT DOCUMENTS

| JP | 2003-348622 A | 12/2003 |
| JP | 2005-236821 A | 9/2005 |

* cited by examiner

*Primary Examiner* — Dave Czekaj
*Assistant Examiner* — Shanika Brumfield
(74) *Attorney, Agent, or Firm* — Sughrue Mion, PLLC

(57) ABSTRACT

A distance to an object is measured for each of a series of left images, and the count of a distance range including the calculated distance increases. A distance range with the highest frequency of appearance is specified from the counter information of a distance table counter, and a left image in which the distance included in the specified distance range is measured is selected. The adjustment amount of the parallax amount adjusted for the selected left image and a corresponding right image is determined to be the adjustment amount of the parallax amount of a panorama image. A series of left images is combined to generate a panorama image and a series of right images is combined to generate a panorama image. A panorama image displayed in stereoscopic view is generated based on the determined adjustment amount of the parallax amount.

15 Claims, 26 Drawing Sheets
(3 of 26 Drawing Sheet(s) Filed in Color)

FIG.4

| FRAME NUMBER | DISTANCE |
|---|---|
| 1 | 2 |
| 2 | 8 |
| 3 | 10 |
| 4 | 6 |
| 5 | 10 |
| 6 | 10 |
| 7 | 10 |
| 8 | 7 |

FIG.5A

| DISTANCE | COUNTER |
|---|---|
| 2 | 1 |
| 4 | 0 |
| 6 | 2 |
| 8 | 1 |
| 10 | 4 |
| ∞ | 0 |

FIG.6
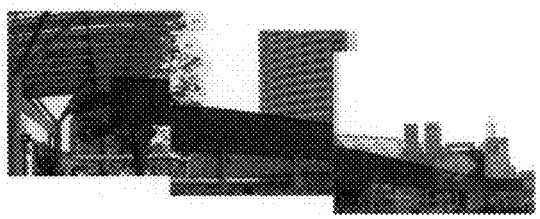
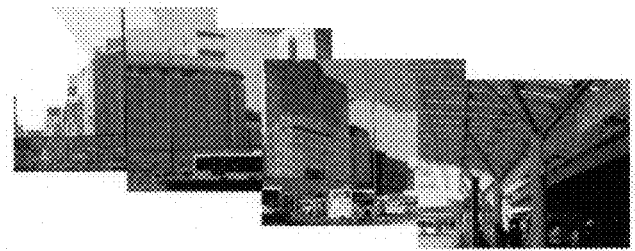

FIG.9

| FRAME NUMBER | DISTANCE |
|---|---|
| 1 | 0.5 |
| 2 | 1 |
| 3 | 2 |
| 4 | 1 |
| 5 | 2 |
| 6 | 3 |
| 7 | 5 |
| 8 | 8 |

FIG.10

| DISTANCE | COUNTER |
|---|---|
| 0.5 | 1 |
| 1.0 | 3 |
| 1.5 | 0 |
| 2.0 | 2 |
| 2.5 | 0 |
| 3.0 | 1 |
| 3.5 | 0 |
| 4.0 | 0 |
| 4.5 | 0 |
| 5.0 | 1 |
| 5.5 | 0 |
| 6.0 | 0 |
| 6.5 | 0 |
| 7.0 | 0 |
| 7.5 | 0 |
| 8.0 | 1 |
| 8.5 | 0 |
| 9.0 | 0 |
| 9.5 | 0 |
| 10 | 0 |

FIG.12A

DISPERSION

| FRAME NUMBER | DISTANCE |
|---|---|
| 1 | 2 |
| 2 | 5 |
| 3 | ∞ |
| 4 | 10 |
| 5 | 8 |
| 6 | 4 |
| 7 | 3 |
| 8 | 1 |

FIG.12B

CONCENTRATION

| FRAME NUMBER | DISTANCE |
|---|---|
| 1 | 10 |
| 2 | 6 |
| 3 | 9 |
| 4 | 11 |
| 5 | 10 |
| 6 | 5 |
| 7 | 3 |
| 8 | 10 |

Frame 1 ← CONCENTRATED DISTANCE
Frame 4 ← CONCENTRATED DISTANCE
Frame 5 ← CONCENTRATED DISTANCE
Frame 8 ← CONCENTRATED DISTANCE

FIG.14

| FRAME NUMBER | DISTANCE |
|---|---|
| 1 | 0.8 |
| 2 | ∞ |
| 3 | ∞ |
| 4 | 4.0 |
| 5 | ∞ |
| 6 | ∞ |
| 7 | ∞ |
| 8 | ∞ |

FIG.15

| DISTANCE | COUNTER |
|---|---|
| 0.8 | 0 |
| 1.0 | 0 |
| 1.5 | 0 |
| 2.0 | 0 |
| 4.0 | 1 |
| 10 | 1 |
| ∞ | 6 |

FIG.18

| FRAME NUMBER | DISTANCE | FACE NUMBER COUNTER |
|---|---|---|
| 1 | 2 | 2 |
| 2 | 5 | 0 |
| 3 | ∞ | 6 |
| 4 | 10 | 8 |
| 5 | 8 | 3 |
| 6 | 4 | 0 |
| 7 | 3 | 0 |
| 8 | 1 | 0 |

FIG.20

| FRAME NUMBER | DISTANCE | FACE NUMBER COUNTER | FACE SIZE ←LARGE  SMALL→ | | | | | | |
|---|---|---|---|---|---|---|---|---|---|
| | | | A | B | C | D | E | F | G |
| 1 | 0.8 | 1 | 0 | 0 | 0 | 0 | 1 | 0 | 0 |
| 2 | ∞ | 0 | 0 | 0 | 0 | 0 | 0 | 0 | 0 |
| 3 | ∞ | 0 | 0 | 0 | 0 | 0 | 0 | 0 | 0 |
| 4 | 4.0 | 2 | 0 | 1 | 0 | 1 | 0 | 0 | 0 |
| 5 | ∞ | 1 | 0 | 0 | 0 | 0 | 0 | 0 | 1 |
| 6 | ∞ | 0 | 0 | 0 | 0 | 0 | 0 | 0 | 0 |
| 7 | ∞ | 0 | 0 | 0 | 0 | 0 | 0 | 0 | 0 |
| 8 | ∞ | 0 | 0 | 0 | 0 | 0 | 0 | 0 | 0 |

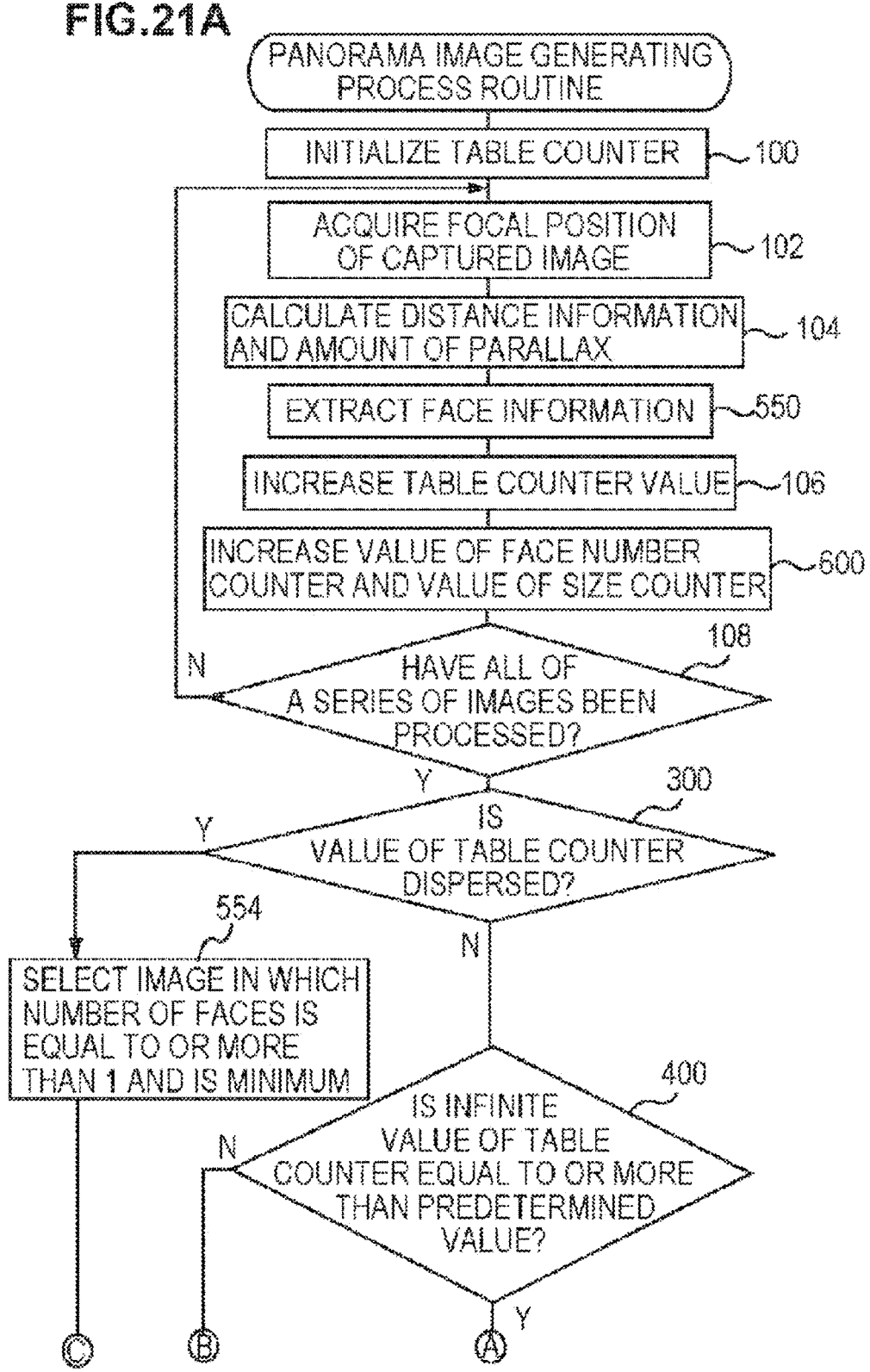

IMAGE PROCESSING APPARATUS, MULTI-EYE DIGITAL CAMERA, AND PROGRAM

BACKGROUND OF THE INVENTION

1. Field of the Invention

The present invention relates to an image processing apparatus, a multi-eye digital camera, and a program, and more particularly, to an image processing apparatus, a multi-eye digital camera, and a program that generates a panorama image displayed in stereoscopic view.

2. Description of the Related Art

An image display method has been proposed which detects a distance to an object of an image, distributes image signals to a plurality of display devices arranged in the depth direction based on the detected distance to the object, and displays still images during the period for which the image signals are not allocated (JP2005-236821A).

In addition, a stereoscopic view video displaying method has been proposed which includes a parallax amount changing step which gradually changes the parallax amount from an initial value in time course (JP2003-348622A).

SUMMARY OF THE INVENTION

However, JP2005-236821A does not disclose a parallax adjustment method. Therefore, it is difficult to calculate an appropriate parallax amount when a panorama-size image is displayed in stereoscopic view. In the technique disclosed in JP2003-348622A, since the parallax amount changes in time course, it takes a long time to obtain an appropriate parallax amount.

The invention has been made in view of the above-mentioned problems and an object of the invention is to provide an image processing apparatus, a multi-eye digital camera, and a program capable of calculating an appropriate adjustment amount of the parallax amount of a panorama image.

In order to achieve the object, according to an aspect of the invention, there is provided an image processing apparatus including: an acquiring unit that acquires two or more groups of a series of images captured in series from two or more different viewpoints in order to generate an image displayed in stereoscopic view; a distance measuring unit that measures a distance to an object for each image of the captured images in series; and a parallax adjustment amount calculating unit that determines the adjustment amount of the parallax amount adjusted between one of the series of captured images selected based on a statistical value of the distance measured by the distance measuring unit and another image that is captured from a different viewpoint and corresponds to the captured image to be the adjustment amount of the parallax amount between panorama images when the series of captured images are combined with each other to generate the panorama images in each of the two or more groups.

According to another aspect of the invention, there is provided a program that allows a computer to function as: an acquiring unit that acquires two or more groups of a series of images captured in series from two or more different viewpoints in order to generate an image displayed in stereoscopic view; a distance measuring unit that measures a distance to an object for each image of the captured images in series; and a parallax adjustment amount calculating unit that determines the adjustment amount of the parallax amount adjusted between one of the series of captured images selected based on a statistical value of the distance measured by the distance measuring unit and another image that is captured from a different viewpoint and corresponds to the captured image to be the adjustment amount of the parallax amount between panorama images when the series of captured images are combined with each other to generate the panorama images in each of the two or more groups.

According to the above-mentioned aspects of the invention, the acquiring unit acquires two or more groups of a series of images captured in series from two or more different viewpoints in order to generate an image displayed in stereoscopic view. The distance measuring unit measures the distance to the object for each image of the captured images in series. The parallax adjustment amount calculating unit determines the adjustment amount of the parallax amount adjusted between one of the series of captured images selected based on the statistical value of the distance measured by the distance measuring unit and another image that is captured from a different viewpoint and corresponds to the captured image to be the adjustment amount of the parallax amount between panorama images when the series of captured images is combined with each other to generate the panorama images in each of the two or more groups.

As such, since the adjustment amount of the parallax amount adjusted for the captured image selected based on the statistical value of the distance to the object is determined to be the adjustment amount of the parallax amount between the panorama images, it is possible to calculate an appropriate adjustment amount of the parallax amount of the panorama images.

According to the above-mentioned aspects of the invention, the parallax adjustment amount calculating unit may determine the adjustment amount of the parallax amount adjusted for the captured image corresponding to the average value of the distance measured for each image of the captured images in series or the captured image in which the distance included in a distance range with the highest frequency of appearance obtained from the distance measured for each image of the captured images in series is measured to be the adjustment amount of the parallax amount between the panorama images.

According to the above-mentioned aspects of the invention, the parallax adjustment amount calculating unit may determine the adjustment amount of the parallax amount adjusted for the captured image in which the shortest distance is measured among the distances measured for each image of the captured images in series to be the adjustment amount of the parallax amount between the panorama images. According this structure, it is possible to obtain a panorama image displayed in stereoscopic view with little incongruity.

According to the above-mentioned aspects of the invention, when the distances measured for each image of the captured images in series are dispersed, the parallax adjustment amount calculating unit may determine a predetermined adjustment amount of the parallax amount to be the adjustment amount of the parallax amount between the panorama images for the two or more groups.

According to the above-mentioned aspects of the invention, when the distances measured for each image of the captured images in series are not dispersed, the parallax adjustment amount calculating unit may determine the adjustment amount of the parallax amount adjusted for the captured image in which the distance included in a distance range with the highest frequency of appearance obtained from the distances measured for each image of the captured images in series is measured to be the adjustment amount of the parallax amount between the panorama images.

According to the above-mentioned aspects of the invention, the predetermined adjustment amount of the parallax amount may be determined based on a position where the optical axis directions from the two or more viewpoints intersect each other. According to this structure, it is possible to obtain a panorama image displayed in stereoscopic view with little incongruity.

The image processing apparatus according to the above-mentioned aspect of the invention may further include a face information extracting unit that extracts face information indicating the number of regions indicating faces or the sizes of the regions from each image of the captured images in series. The parallax adjustment amount calculating unit may determine the adjustment amount of the parallax amount adjusted for one of the series of captured images selected based on the statistical value of the distance measured by the distance measuring unit and the face information extracted by the face information extracting unit to be the adjustment amount of the parallax amount between the panorama images. According to this structure, it is possible to obtain a panorama image displayed in stereoscopic view with little incongruity.

According to the above-mentioned aspects of the invention, when the distances measured for each image of the captured images in series are not dispersed, the parallax adjustment amount calculating unit may select one of the series of captured images based on the statistical value of the distance. When the distances are dispersed, the parallax adjustment amount calculating unit may select one of the series of captured images based on the face information. The parallax adjustment amount calculating unit may determine the adjustment amount of the parallax amount adjusted for the selected captured image to be the adjustment amount of the parallax amount between the panorama images. According to this structure, it is possible to obtain a panorama image displayed in stereoscopic view with little incongruity.

According to the above-mentioned aspects of the invention, when the distances are dispersed, the parallax adjustment amount calculating unit may select the captured image in which the number of regions indicating the faces is the minimum among the captured images including one or more regions indicating the faces, and determine the adjustment amount of the parallax amount adjusted for the selected captured image to be the adjustment amount of the parallax amount between the panorama images.

According to the above-mentioned aspects of the invention, when the distances are not dispersed and the number of infinite distances is equal to or more than a predetermined value among the distances measured for each image of the captured images in series, the parallax adjustment amount calculating unit may select the captured image in which the size of the region indicating the face is equal to or more than a predetermined value. When the distances are not dispersed and the number of infinite distances is less than the predetermined value, the parallax adjustment amount calculating unit may select the captured image in which the distance included in the distance range with the highest frequency of appearance obtained from the distances measured for each image of the captured images in series is measured. The parallax adjustment amount calculating unit may determine the adjustment amount of the parallax amount adjusted for the selected captured image to be the adjustment amount of the parallax amount between the panorama images. According to this structure, it is possible to obtain a panorama image displayed in stereoscopic view with little incongruity.

The image processing apparatus according to the above-mentioned aspect of the invention may further include a display unit that displays the panorama images for the two or more groups based on the adjustment amount of the parallax amount calculated by the parallax adjustment amount calculating unit in stereoscopic view.

According to the above-mentioned aspects of the invention, when the number of infinite distances is equal to or more than the predetermined value among the distances measured for each image of the captured images in series, the display unit may display the panorama images as two-dimensional (planer) images. According to this structure, it is possible to provide an image to the user without causing a feeling of fatigue.

According to the above-mentioned aspects of the invention, when displaying each image of the captured images in series in stereoscopic view, the display unit may display the captured image in stereoscopic view based on the adjustment amount of the parallax amount between the captured image and another captured image that is captured from a different viewpoint and corresponds to the captured image. According to this structure, it is possible to provide a panorama image displayed in stereoscopic view without incongruity to the user.

According to another aspect of the invention, there is provided a multi-eye digital camera including: the above-mentioned image processing apparatus; and imaging units that capture a plurality of images from two or more different viewpoints.

As described above, according to the aspects of the invention, since the adjustment amount of the parallax amount adjusted for the captured image selected based on the statistical value of the distance to the object is determined to be the adjustment amount of the parallax amount between the panorama images, it is possible to calculate an appropriate adjustment amount of the parallax amount of the panorama images.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 4 is a diagram illustrating a distance to an object measured for each captured image;

FIG. 5A is a diagram illustrating an example of a distance table counter;

FIG. 6 is a diagram illustrating an example of a series of captured images captured in a continuous combination of the single shot modes or the continuous shot mode;

FIG. 9 is a diagram illustrating the distance to the object measured for each captured image;

FIG. 10 is a diagram illustrating an example of the distance table counter;

FIG. 12A is a diagram illustrating the dispersion of the distances to the object measured for each captured image;

FIG. 12B is a diagram illustrating the concentration of the distances to the object measured for each captured image;

FIG. 14 is a diagram illustrating the distance to the object measured for each captured image;

FIG. 15 is a diagram illustrating an example of the distance table counter;

FIG. 18 is a diagram illustrating the distance to the object measured for each captured image and a face number counter recorded for each captured image;

FIG. 20 is a diagram illustrating the distance to the object measured for each captured image, the face number counter recorded for each captured image, and a face size counter; and FIGS. 21A and 21B are flowcharts illustrating the content of a panorama image generating process routine according to a sixth embodiment.

DESCRIPTION OF THE PREFERRED EMBODIMENTS

Hereinafter, exemplary embodiments of the invention will be described in detail with reference to the accompanying drawings. In the embodiments, a case in which an imaging device according to the invention is applied to a multi-eye digital camera will be described.

Figure 1:
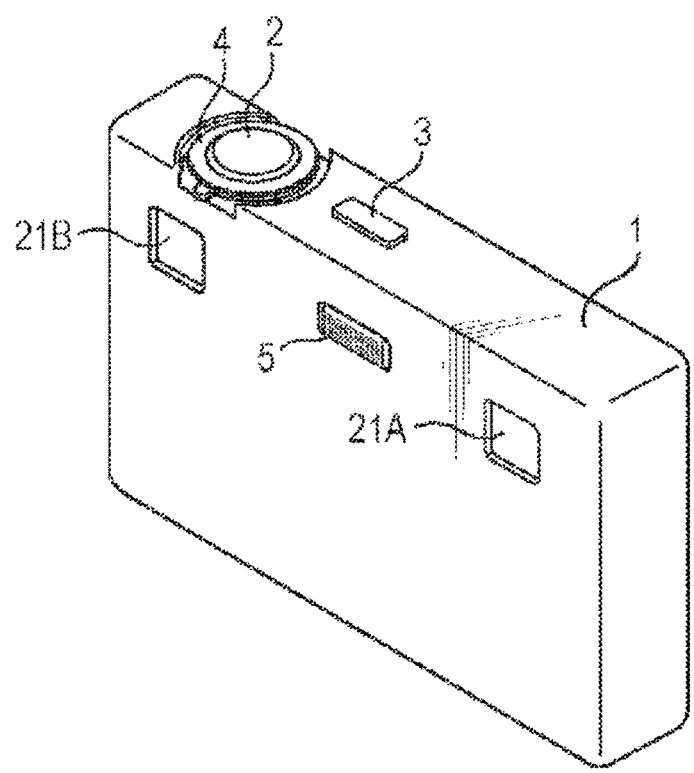
FIG. 1 is a front perspective view illustrating a multi-eye digital camera according to an embodiment of the invention.
Figure 2:
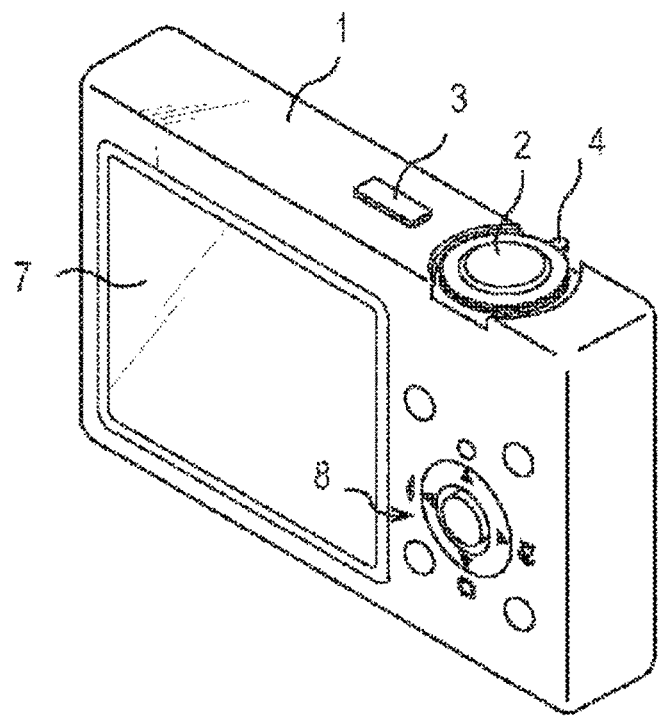
FIG. 2 is a rear perspective view illustrating the multi-eye digital camera according to the embodiment.

FIG. 1 is a front perspective view illustrating a multi-eye digital camera 1 according to a first embodiment and FIG. 2 is a rear perspective view illustrating the multi-eye digital camera 1. As shown in FIG. 1, a release button 2, a power button 3, and a zoom lever 4 are provided at the upper part of the multi-eye digital camera 1. A flash 5 and lenses of two imaging units 21A and 21B are provided on the front surface of the multi-eye digital camera 1. In addition, a liquid crystal monitor 7 that displays various kinds of information and various kinds of operation buttons 8 are provided on the rear surface of the multi-eye digital camera 1.

Figure 3:
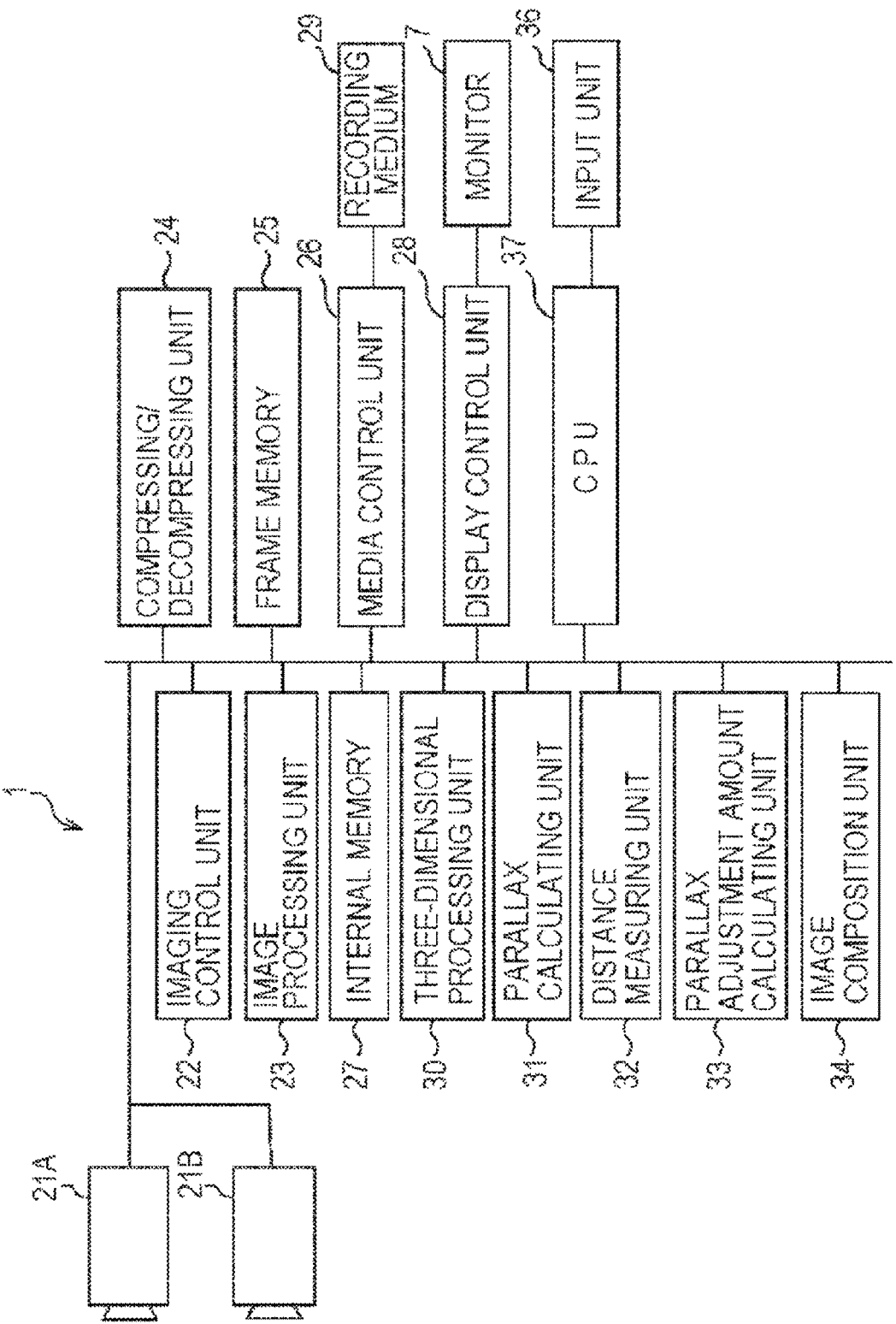
FIG. 3 is a block diagram schematically illustrating the internal structure of the multi-eye digital camera according to a first embodiment.

FIG. 3 is a block diagram schematically illustrating the internal structure of the multi-eye digital camera 1. As shown in FIG. 3, the multi-eye digital camera 1 includes the two imaging units 21A and 21B, an imaging control unit 22, an image processing unit 23, a compressing/decompressing unit 24, a frame memory 25, a media control unit 26, an internal memory 27, a display control unit 28, an input unit 36, and a CPU 37. The imaging units 21A and 21B have a convergence angle viewing an object and are arranged in a predetermined base line. The information of the convergence angle and the base line is stored in the internal memory 27.

The imaging control unit 22 includes an AF unit (not shown) and an AE unit (not shown). When the release button 2 is pressed halfway, the AF unit determines an object region to be a focus region based on pre-images acquired by the imaging units 21A and 21B, determines the focal position of the lens, and outputs the focal position to the imaging units 21A and 21B. The AE unit determines an aperture value and a shutter speed based on the pre-images and outputs the aperture value and the shutter speed to the imaging units 21A and 21B.

In a single shot mode in which one image is captured, when the release button 2 is fully pressed, the imaging control unit 22 issues a main imaging instruction to control the imaging unit 21A to capture the main image of a left image and control the imaging unit 21B to capture the main image of a right image. In a continuous shot mode in which a plurality of images is continuously captured, the imaging control unit 22 continuously issues the main imaging instruction to control the imaging unit 21A to capture the main image of a left image and control the imaging unit 21B to capture the main image of a right image a predetermined number of times. In a panorama imaging mode, the imaging control unit 22 controls the imaging units 21A and 21B to capture a predetermined number of left images and right images in a continuous combination of the single shot modes or the continuous shot mode. Before the release button 2 is operated, the imaging control unit 22 instructs the imaging units 21A and 21B to sequentially capture a live view image that is for checking an imaging range and has pixels whose number is less than that of the main image at a predetermined time interval (for example, an interval of 1/30 second).

The image processing unit 23 performs image processing, such as a white balance adjusting process, gradation correction, sharpness correction, and color correction, on the digital image data of the left and right images captured by the imaging units 21A and 21B.

The compressing/decompressing unit 24 compresses the image data indicating the left image and the right image processed by the image processing unit 23 in a compression format, such as JPEG, thereby generating an image file displayed in stereoscopic view. The image file displayed in stereoscopic view stores the image data of the left and right images, additional information, such as the base line, the convergence angle, and imaging date and time, and focus information indicating the focal position of the lens, based on, for example, an Exif format.

The frame memory 25 is a work memory that is used when various kinds of processes including the process of the image processing unit 23 are performed on the image data indicating the left and right images acquired by the imaging units 21A and 21B.

The media control unit 26 controls the writing and reading of, for example, the image file to and from the recording medium 29 by accessing.

The internal memory 27 stores, for example, various kinds of constants set in the multi-eye digital camera 1 and programs executed by the CPU 37.

The display control unit 28 displays an image displayed in stereoscopic view generated from the left image and the right image stored in the frame memory 25 on the liquid crystal monitor 7 during image capture, or displays the left image and the right image or the image displayed in stereoscopic view recorded on the recording medium 29 on the liquid crystal monitor 7. In addition, the display control unit 28 displays the live view image on the liquid crystal monitor 7. The display control unit 28 and the liquid crystal monitor 7 are an example of a display unit.

The multi-eye digital camera 1 further includes a three-dimensional processing unit 30, a parallax calculating unit 31, a distance measuring unit 32, a parallax adjustment amount determining unit 33, and an image combining unit 34.

The parallax calculating unit 31 and the parallax adjustment amount determining unit 33 are an example of a parallax adjustment amount calculating unit.

The three-dimensional processing unit 30 performs three-dimensional processing on the left image and the right image to generate an image displayed in stereoscopic view, in order to display in stereoscopic view the left image and the right image on the liquid crystal monitor 7. For example, the three-dimensional processing unit 30 adjusts the parallax amount based on the calculated adjustment amount of the parallax amount, thereby generating the image displayed in stereoscopic view.

The parallax calculating unit 31 calculates the feature points of the left image and the right image, associates the feature points, and calculates the difference between the feature points of the left and right images of an object included in the left image and the right image in the horizontal direction as the parallax amount. In addition, the parallax calculating unit 31 calculates the adjustment amount for adjusting the parallax amount of a main object included in the left image and the right image such that the parallax amount is a predetermined value (for example, 0). The adjustment amount of the parallax amount is the adjustment amount when the parallax amount of each pixel calculated for the corresponding left and right images is adjusted for the entire image.

Figure 5A:
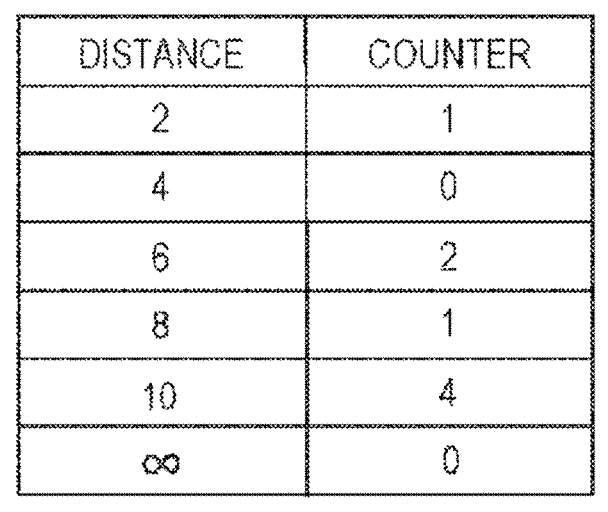

The distance measuring unit 32 measures the distance from the object based on the focal position of the lens in the object region obtained by the AF unit of the imaging control unit 22. In addition, in the panorama imaging mode, the distance measuring unit 32 measures the distance from the object for each of a series of left images (or right images) captured in a continuous combination of the single shot modes or the continuous shot mode, as shown in FIG. 4, and records the frequency of appearance of each distance range of 2 m (0 to 2 m, 2 m to 4 m, . . . , ∞) on a distance table counter indicating the frequency of appearance of the distance range, as shown in FIG. 5A.

Figure 5B:
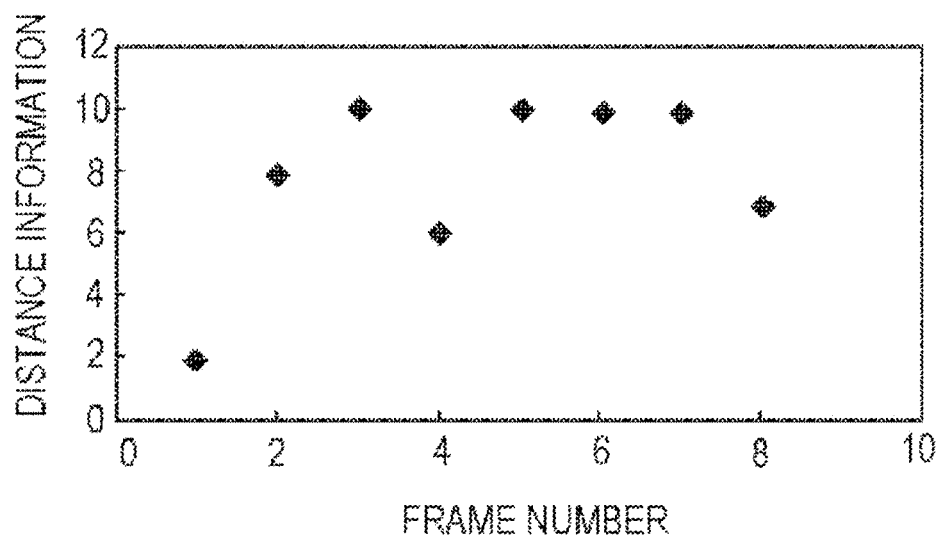
FIG. 5B is a diagram illustrating the distribution of the distance to the object.

In the panorama imaging mode, the parallax adjustment amount determining unit 33 selects, from the series of captured images, a captured image in which the distance included in the distance range with the highest frequency of appearance is measured based on the distribution of the distance to the object shown in FIG. 5B obtained from the distance table counter (for example, a captured image of frame number 7 in FIG. 4). The parallax adjustment amount determining unit 33 determines the adjustment amount of the parallax amount of the corresponding left and right images of the selected captured image calculated by the parallax calculating unit 31 to be the adjustment amount of the parallax amount when a panorama image is displayed in stereoscopic view.

Figure 7A:
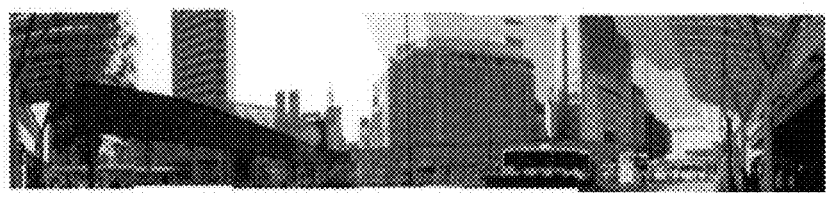
FIG. 7A is a diagram illustrating an example of a panorama image obtained by combining a series of left images.
Figure 7B:
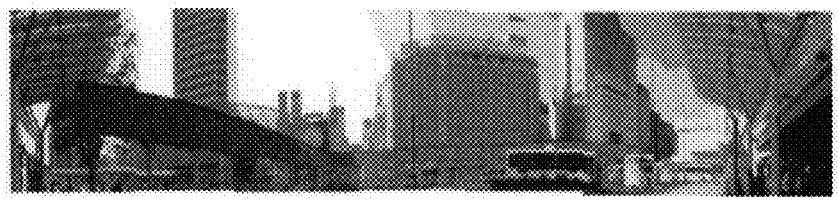
FIG. 7B is a diagram illustrating an example of a panorama image obtained by combining a series of right images.

In the panorama imaging mode, the image combining unit 34 combines a series of left images shown in FIG. 6 which is captured in a continuous combination of the single shot modes or the continuous shot mode to generate a panorama image shown in FIG. 7A. In addition, the image combining unit 34 combines a series of right images captured in a continuous combination of the single shot modes or the continuous shot mode to generate a panorama image shown in FIG. 7B.

Next, the operation of the multi-eye digital camera 1 according to the first embodiment will be described.

First, the panorama imaging mode is selected from a menu screen displayed on the liquid crystal monitor 7. The menu button is pushed to display the menu screen on the liquid crystal monitor 7. In the digital camera according to this embodiment, a shutter mode setting item is prepared in one of the menu items displayed on the menu screen, and the shutter mode setting item is selected to select one of the single shot mode and the continuous shot mode.

When the panorama imaging mode is selected, imaging is performed a predetermined number of times in a continuous combination of the single shot modes or the continuous shot mode, and a predetermined number of left images and right images captured by the imaging units 21A and 21B are temporarily stored in the frame memory 25. Even when imaging is performed in the continuous shot mode, the focal position of the lens is determined and focusing control is performed each time one image is captured.

Figure 8:
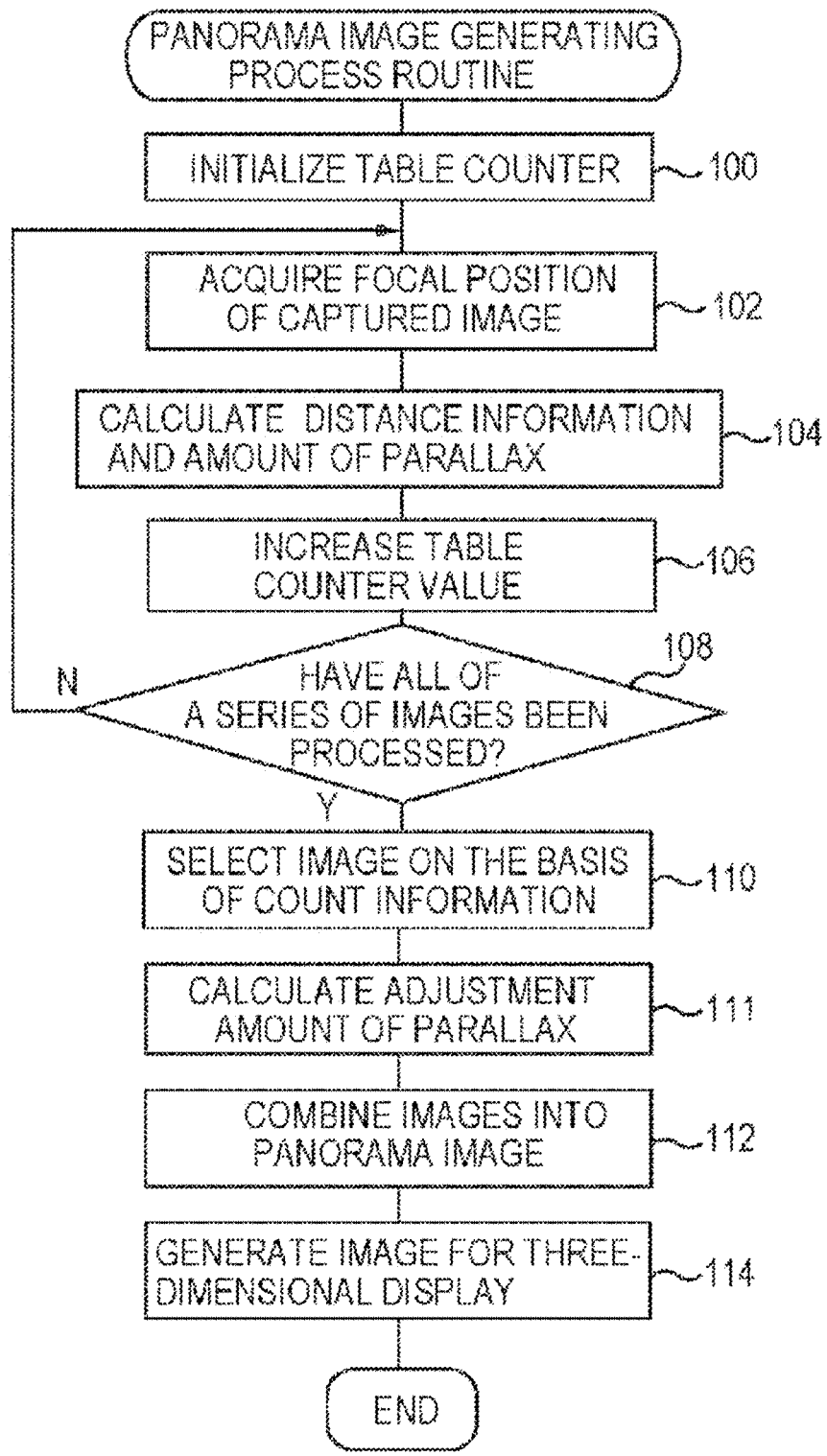
FIG. 8 is a flowchart illustrating the content of a panorama image generating process routine according to the first embodiment.

When two groups of a series of images, that is, a series of left images and a series of right images are acquired from the frame memory 25, a panorama image generating process routine shown in FIG. 8 is performed in the multi-eye digital camera 1.

First, in Step 100, a distance table counter is initialized. In Step 102, in the series of left images (or right images), the focal position of the lens in the object region determined by the AF unit is acquired. In Step 104, the distance to the object is measured. In addition, the adjustment amount of the parallax amount between the series of left images and the corresponding right images is calculated.

In Step 106, in the distance table counter, the count of the distance range including the distance calculated in Step 104 increases. In Step 108, it is determined whether Steps 102 to 106 have been performed on all of the series of left images. When there is a left image that has not been processed by the above-mentioned steps among the series of left images, the process returns to Step 102 and the above-mentioned steps are repeatedly performed on the image. On the other hand, when the above-mentioned steps have been performed on all of the series of left images, the process proceeds to Step 110. In Step 110, the distance range with the highest frequency of appearance is specified from the counter information of the distance table counter, and the left image in which the distance included in the specified distance range is measured is selected. In addition, the adjustment amount of the parallax amount calculated between the selected left image and the corresponding right image is determined to be the adjustment amount of the parallax amount of the panorama images.

In Step 112, the series of left images is combined to generate a panorama image, and the series of right images is combined to generate a panorama image. In Step 114, a panorama image displayed in stereoscopic view is generated from the two panorama images generated in Step 112 based on the adjustment amount of the parallax amount determined in Step 110 and is then stored in the recording medium 29. Then, the panorama image generating process routine ends. In this case, in addition to the panorama image obtained by connecting a predetermined number of images, each image displayed in stereoscopic view is generated based on the adjustment amount of the parallax amount calculated for each of the captured images and is then stored in the recording medium 29.

The panorama image displayed in stereoscopic view stored in the recording medium 29 by the panorama image generating process routine is read from the recording medium 29 in response to a reproduction instruction, is changed to non-compressed YC signals by the compressing/decompressing unit 24 (when the image data to be reproduced is compressed image data), and is then output to the liquid crystal monitor 7 through the display control unit 28. In this way, the panorama image is reproduced and displayed on the liquid crystal monitor 7 in stereoscopic view.

When each of the captured images is displayed in stereoscopic view, each of the generated images displayed in stereoscopic view is read from the recording medium 29 and then output to the liquid crystal monitor 7 through the display control unit 28. In this way, each of the captured images is reproduced and displayed in stereoscopic view on the liquid crystal monitor 7.

As described above, according to the multi-eye digital camera of the first embodiment, the adjustment amount of the parallax amount of one image selected based on the statistical value of the distance to the object is calculated, and the calculated adjustment amount is determined to be the adjustment amount of the parallax amount between the left and right panorama images. In this way, it is possible to calculate an appropriate adjustment amount of the parallax amount of the panorama images. For the distance to the object, the adjustment amount of the parallax amount of the left image in which the distance included in the distance range with the highest frequency of appearance is measured is used as the adjustment amount of the parallax amount of the entire panorama image. Therefore, it is possible to obtain a panorama image displayed in stereoscopic view with little incongruity.

When the panorama image is generated from a plurality of images or the images captured in the continuous shot mode, parallax is determined based on the first frame, and a captured object is disposed on the front side of the initial object with parallax in the depth direction in the continuous shot mode, incongruity occurs in the image. When parallax is changed for each frame, incongruity occurs in the connection of the frames and an image difficult to see is obtained. In this embodiment, the adjustment amount of the parallax amount of the panorama images is determined based on the statistical information of image information, not the first frame of image or the central image. Therefore, it is possible to generate a panorama image displayed in stereoscopic view with little incongruity.

When a series of left images and a series of right images are combined into panorama images and are then displayed in stereoscopic view, an image in which the distance from the object is included in the distance range with the highest frequency of appearance in the distribution of the distance to the object based on the focal position is selected from the images, and the adjustment amount of the parallax amount of the selected image is determined to be the adjustment amount for the entire parallax amount. Therefore, it is possible to set parallax with little incongruity in display in stereoscopic view.

In the first embodiment, for the distance to the object, the adjustment amount of the parallax amount of the left image in which the distance included in the distance range with the highest frequency of appearance is measured is determined to be the adjustment amount of the parallax amount of the entire panorama image, but the invention is not limited thereto. For example, the average value of the distance to the object may be calculated as the statistical information of the distance to the object, an image in which the distance between the objects is closest to the average value of the distance may be selected, and the adjustment amount of the parallax amount of the selected image may be determined to be the adjustment amount of the parallax amount of the entire panorama image.

Next, a second embodiment will be described. The structure of a multi-eye digital camera according to the second embodiment is the same as that of the multi-eye digital camera 1 according to the first embodiment. Therefore, the same components as those of the multi-eye digital camera 1 according to the first embodiment are denoted by the same reference numerals and a description thereof will be omitted.

The second embodiment differs from the first embodiment in that the adjustment amount of the parallax amount of an image in which the distance to the object is the shortest is used as the adjustment amount of the parallax amount of the panorama image.

In the multi-eye digital camera according to the second embodiment, in the panorama imaging mode, for example, the distance measuring unit 32 measures the distance to the object for each of a series of left images (or right images) captured in a continuous combination of the single shot modes or the continuous shot mode, as shown in FIG. 9, and stores the frequency of appearance of each distance range of, for example, 0.5 m (0 to 0.5 m, 0.5 m to 1 m, . . . ) in a distance table counter indicating the frequency of appearance of the distance range, as shown in FIG. 10.

In the panorama imaging mode, the parallax adjustment amount determining unit 33 determines whether the distance to the object is entirely distributed in a short range based on the distance table counter. For example, when the sum of the count values in a predetermined distance range is equal to or more than a predetermined value, it is determined that the distance to the object is entirely distributed in the short range. When it is determined that the distance to the object is entirely distributed in the short range, the parallax adjustment amount determining unit 33 selects a captured image in which the distance to the object is the shortest from a series of captured images (for example, a captured image of frame number 1 in FIG. 9). The parallax adjustment amount determining unit 33 determines the adjustment amount of the parallax amount of the corresponding left and right images of the selected captured image calculated by the parallax calculating unit 31 to be the adjustment amount of the parallax amount when a panorama image is displayed in stereoscopic view.

When it is determined that the distance to the object is not entirely distributed in the short range, the parallax adjustment amount determining unit 33 selects a captured image closest to the average value of the distance to the object from the series of captured images, and determines the adjustment amount of the parallax amount of the corresponding left and right images of the selected captured image calculated by the parallax calculating unit 31 to be the adjustment amount of the parallax amount when a panorama image is displayed in stereoscopic view.

Figure 11:
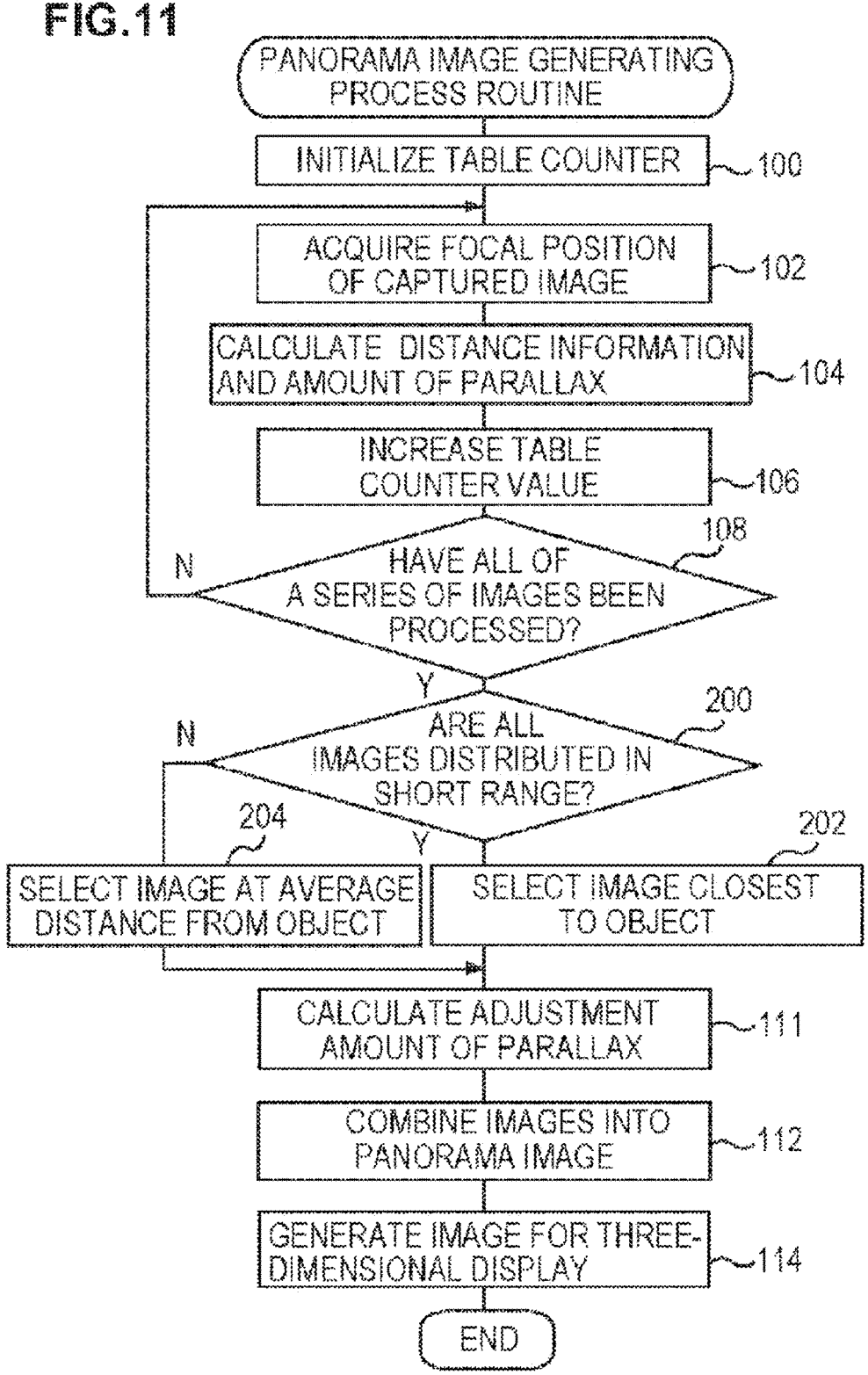
FIG. 11 is a flowchart illustrating the content of a panorama image generating process routine according to a second embodiment.

A panorama image generating process routine of the multi-eye digital camera according to the second embodiment will be described with reference to FIG. 11. The same steps as those in the panorama image generating process routine according to the first embodiment are denoted by the same reference numerals and a description thereof will be omitted.

First, in Step 100, the distance table counter is initialized. In Step 102, for a series of left images (or right images), the focal position of the lens in an object region is acquired. In Step 104, the distance to the object is measured and the adjustment amount of the parallax amount is calculated.

In Step 106, the count of the distance range including the distance calculated in Step 104 increases in the distance table counter. In Step 108, it is determined whether Steps 102 to 106 have been performed on all of the series of left images. When it is determined that Steps 102 to 106 have been performed on all of the series of left images, the process proceeds to Step 200.

In Step 200, it is determined whether the distance is entirely distributed in the short range from the counter information of the distance table counter. When it is determined that the distance is entirely distributed in the short range, in Step 202, a left image in which the distance to the object is the shortest is selected. The adjustment amount of the parallax amount calculated for the selected left image and the corresponding right image is determined to be the adjustment amount of the parallax amount of the panorama images.

When it is determined in Step 200 that the distance is not entirely distributed in the short range, in Step 204, a left image closest to the average value of the distance to the object is selected. In addition, the adjustment amount of the parallax amount calculated for the selected left image and the corresponding right image is determined to be the adjustment amount of the parallax amount of a panorama image.

In Step 112, the series of left images is combined to generate a panorama image, and the series of right images is combined to generate a panorama image. In Step 114, a panorama image displayed in stereoscopic view is generated from the two panorama images generated in Step 112 based on the adjustment amount of the parallax amount determined in Step 202 or 204 and is then stored in the recording medium 29. Then, the panorama image generating process routine ends.

As described above, according to the multi-eye digital camera of the second embodiment, a series of left images and a series of right images are combined into panorama images. When the panorama images are displayed in stereoscopic view, the adjustment amount of the parallax amount of the image with the shortest distance to the object is determined to be the adjustment amount for the entire parallax amount. Therefore, it is possible to provide a panorama image more effectively displayed in stereoscopic view.

Next, a third embodiment will be described. The structure of a multi-eye digital camera according to the third embodiment is the same as that of the multi-eye digital camera 1 according to the first embodiment. Therefore, the same components as those of the multi-eye digital camera 1 according to the first embodiment are denoted by the same reference numerals and a description thereof will be omitted.

The third embodiment differs from the first embodiment in that, when the distance to the object is dispersed, the adjustment amount of the parallax amount when a cross point is a parallax position is used as the adjustment amount of the parallax amount of the panorama image.

In the multi-eye digital camera according to the third embodiment, the parallax adjustment amount determining unit 33 determines whether the distance to the object is dispersed based on the distance table counter in the panorama imaging mode. For example, when the sum of the number of counts of the range in which the difference between the distance to the object and the average value of the distance is equal to or more than a predetermined value is equal to or more than a predetermined value (for example, as shown in FIG. 12A, when the sum of the number of counts of the range in which the difference between the distance and the average value is equal to or more than 3 is equal to or more than half of the number of captured images), it is determined that the distance to the object is dispersed. When it is determined that the distance to the object is dispersed, the parallax adjustment amount determining unit 33 determines the adjustment amount (that is, the adjustment amount is 0) of the parallax amount predetermined when a cross point (an intersection point between the optical axis directions of the lenses of the imaging units 21A and 21B) is the focal position to be the adjustment amount of the parallax amount when a panorama image is displayed in stereoscopic view.

As shown in FIG. 12B, when the distribution of the distance to the object is concentrated and it is determined that the distance to the object is not dispersed, the parallax adjustment amount determining unit 33 selects a captured image in which the distance included in the distance range with the highest frequency of appearance is measured from a series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

Figure 13:
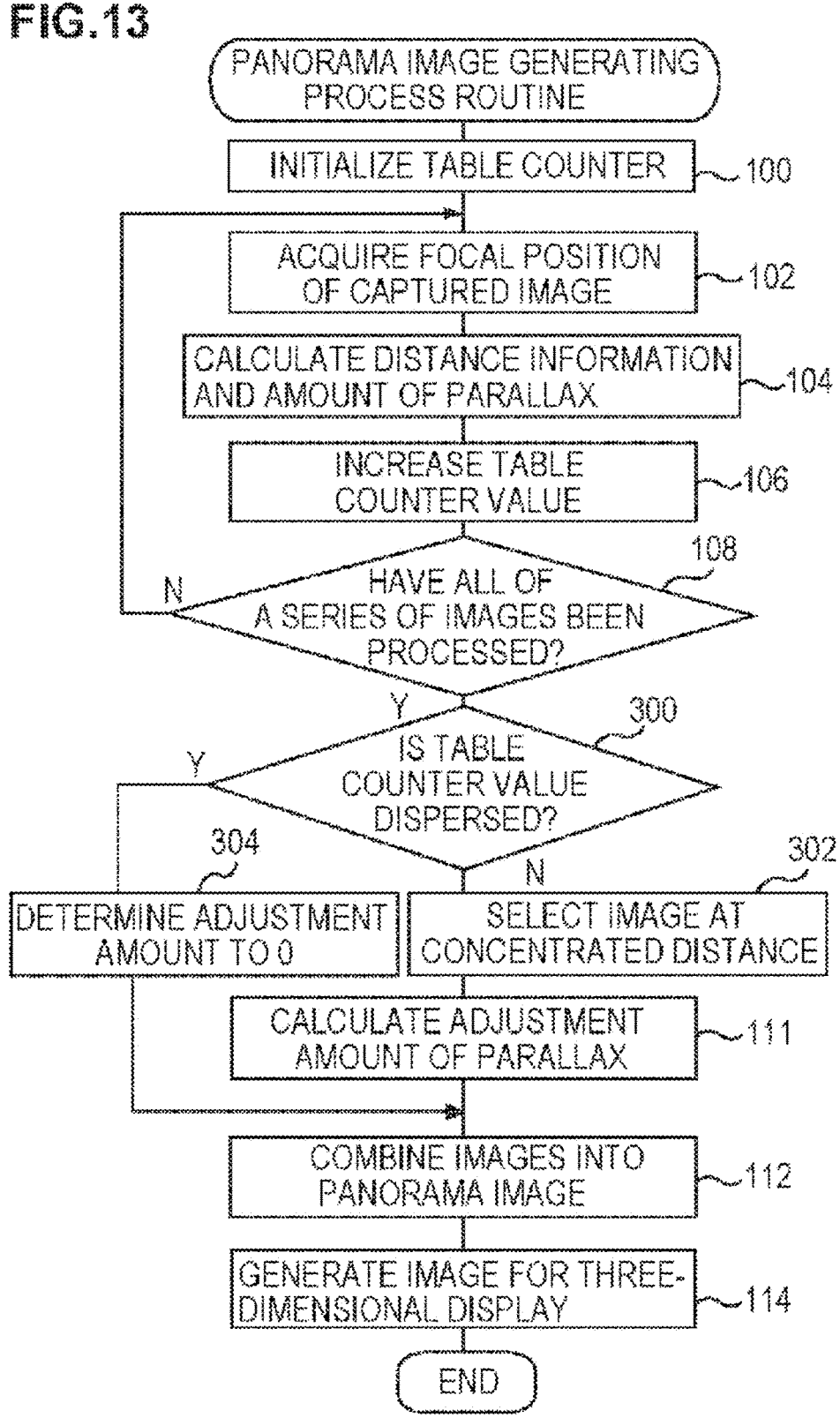
FIG. 13 is a flowchart illustrating the content of a panorama image generating process routine according to a third embodiment.

A panorama image generating process routine of the multi-eye digital camera according to the third embodiment will be described with reference to FIG. 13. The same steps as those in the panorama image generating process routine according to the first embodiment are denoted by the same reference numerals and a description thereof will be omitted.

First, in Step 100, the distance table counter is initialized. In Step 102, for a series of left images (or right images), the focal position of the lens in an object region is acquired. In Step 104, the distance to the object is measured and the adjustment amount of the parallax amount is calculated.

In Step 106, the count of the distance range including the distance calculated in Step 104 increases in the distance table counter. In Step 108, it is determined whether Steps 102 to 106 have been performed on all of the series of left images. When it is determined that Steps 102 to 106 have been performed on all of the series of left images, the process proceeds to Step 300.

In Step 300, it is determined whether the distance to the object is dispersed from the counter information of the distance table counter. When it is determined that the distance to the object is not dispersed, in Step 302, the distance range with the highest frequency of appearance is specified from the counter information of the distance table counter, and a left image in which the distance included in the specified distance range is measured is selected. In addition, the adjustment amount of the parallax amount calculated for the selected left image and the corresponding right image is determined to be the adjustment amount of the parallax amount of the panorama images.

When it is determined in Step 300 that the distance to the object is dispersed, in Step 304, the adjustment amount of the parallax amount calculated in advance when a cross point is a parallax position is determined to be the adjustment amount of the parallax amount of the panorama images.

In Step 112, the series of left images is combined to generate a panorama image, and the series of right images is combined to generate a panorama image. In Step 114, a panorama image displayed in stereoscopic view is generated from the two panorama images generated in Step 112 based on the adjustment amount of the parallax amount determined in Step 302 or 304 and is then stored in the recording medium 29. Then, the panorama image generating process routine ends.

As described above, according to the multi-eye digital camera of the third embodiment, for a series of images, when the focal position is entirely dispersed, the adjustment amount of the parallax amount calculated based on the cross point is determined to be the adjustment amount of the parallax amount of the entire panorama image. Therefore, it is possible to view a panorama image displayed in stereoscopic view with little incongruity.

Next, a fourth embodiment will be described. The structure of a multi-eye digital camera according to the fourth embodiment is the same as that of the multi-eye digital camera 1 according to the first embodiment. Therefore, the same components as those of the multi-eye digital camera 1 according to the first embodiment are denoted by the same reference numerals and a description thereof will be omitted.

The fourth embodiment differs from the first embodiment in that, when the number of counts of ∞ is equal to or more than a predetermined value in the distance table counter, a two-dimensional panorama image is used without any change and an image displayed in stereoscopic view is not generated.

Figure 14:
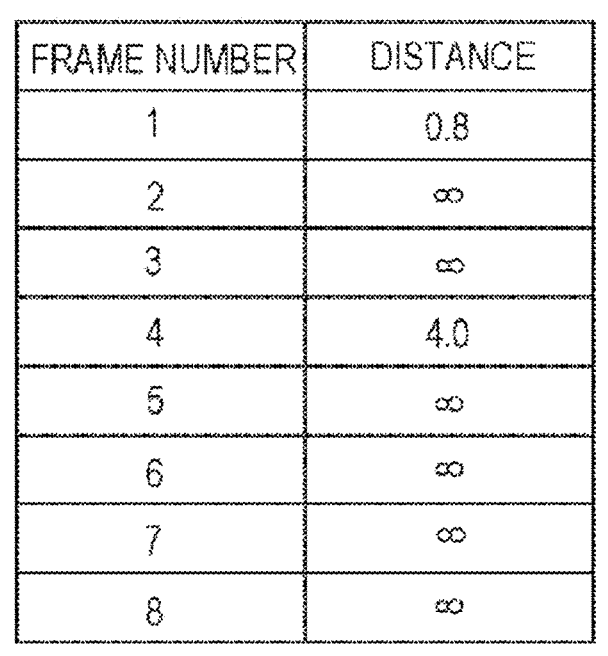
Figure 15:
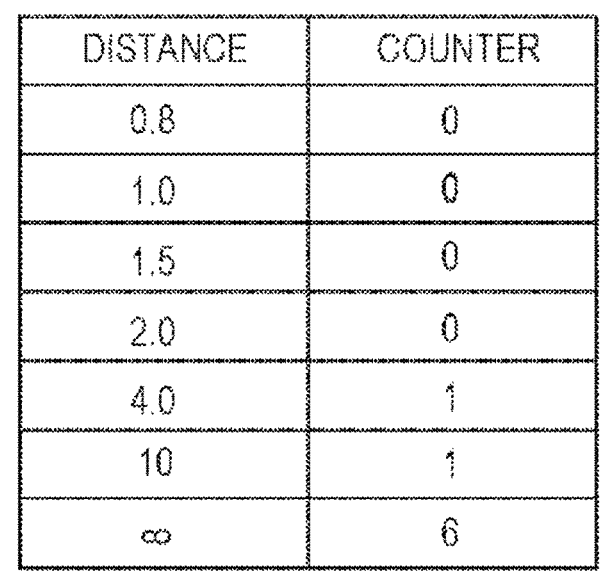

In the multi-eye digital camera according to the fourth embodiment, in the panorama imaging mode, the parallax adjustment amount determining unit 33 determines whether the number of counts of ∞ is equal to or more than a predetermined value (for example, half of the number of images captured in series) based on the distance table counter. For example, when infinity is measured as the distance to the object in half or more of the number of images as shown in FIG. 14 and a distance table counter shown in FIG. 15 is obtained, it is determined that the number of counts of ∞ is equal to or more than the predetermined value. For the distance to the object, when it is determined that the number of counts of ∞ is equal to or more than the predetermined value, the parallax adjustment amount determining unit 33 does not determine the adjustment amount of the parallax amount when a panorama image is displayed in stereoscopic view and uses the two-dimensional panorama image without any change.

For the distance to the object, when it is determined that the number of counts of ∞ is less than the predetermined value, the parallax adjustment amount determining unit 33 selects a captured image in which the distance included in the distance range with the highest frequency of appearance is measured from a series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

Figure 16:
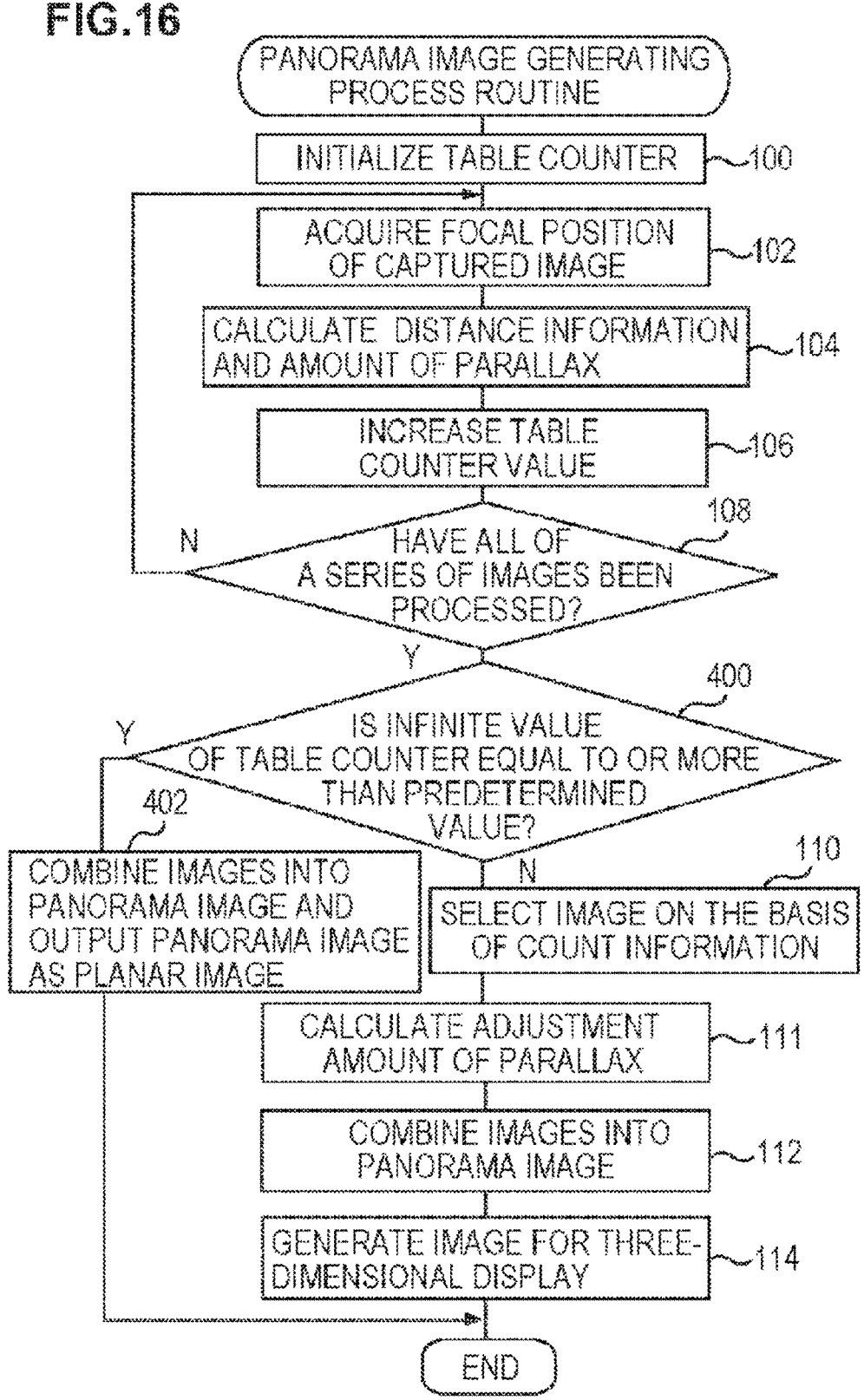
FIG. 16 is a flowchart illustrating the content of a panorama image generating process routine according to a fourth embodiment.

A panorama image generating process routine of the multi-eye digital camera according to the fourth embodiment will be described with reference to FIG. 16. The same steps as those in the panorama image generating process routine according to the first embodiment are denoted by the same reference numerals and a description thereof will be omitted.

First, in Step 100, the distance table counter is initialized. In Step 102, for a series of left images (or right images), the focal position of the lens in an object region is acquired. In Step 104, the distance to the object is measured and the adjustment amount of the parallax amount is calculated.

In Step 106, the count of the distance range including the distance calculated in Step 104 increases in the distance table counter. In Step 108, it is determined whether Steps 102 to 106 have been performed on all of the series of left images. When it is determined that Steps 102 to 106 have been performed on all of the series of left images, the process proceeds to Step 400.

In Step 400, it is determined whether the number of counts of ∞ is equal to or more than a predetermined value from the counter information of the distance table counter. When it is determined that the number of counts of ∞ is equal to or more than the predetermined value, in Step 402, a series of left images is combined to generate a panorama image and the panorama image is stored as a two-dimensional image in the recording medium 29. Then, the panorama image generating process routine ends.

On the other hand, when it is determined in Step 400 that the number of counts of ∞ is less than the predetermined value, in Step 110, the distance range with the highest frequency of appearance is specified, and a left image in which the distance included in the specified distance range is measured is selected. In addition, the adjustment amount of the parallax amount calculated for the selected left image and the corresponding right image is determined to be the adjustment amount of the parallax amount of the panorama image.

In Step 112, a series of left images is combined to generate a panorama image, and a series of right images is combined to generate a panorama image. In Step 114, a panorama image displayed in stereoscopic view is generated from the two panorama images generated in Step 112 based on the adjustment amount of the parallax amount determined in Step 110 and is then stored in the recording medium 29. Then, the panorama image generating process routine ends.

The panorama image as the two-dimensional image stored in the recording medium 29 by the panorama image generating process routine is read from the recording medium 29 in response to a reproduction instruction and is then output to the liquid crystal monitor 7 through the display control unit 28. In this way, the panorama image is reproduced and displayed as a two-dimensional image on the liquid crystal monitor 7.

As described above, according to the multi-eye digital camera of the fourth embodiment, in a series of images for generating a panorama image, when the number of images having infinity measured as the distance to the object is equal to or more than a predetermined value, an image displayed in stereoscopic view is not generated and the panorama image is displayed as a two-dimensional image. Therefore, it is possible to prevent the generation of an image that is not suitable displayed in stereoscopic view and provide a panorama image that does not give the user a feeling of fatigue.

Next, a fifth embodiment will be described. The same components as those in the multi-eye digital camera 1 according to the first embodiment are denoted by the same reference numerals and a description thereof will be omitted.

The fifth embodiment differs from the first embodiment in that a face region is extracted from each of a series of captured images and the number of face regions is also considered to determine the parallax amount of a panorama image.

Figure 17:
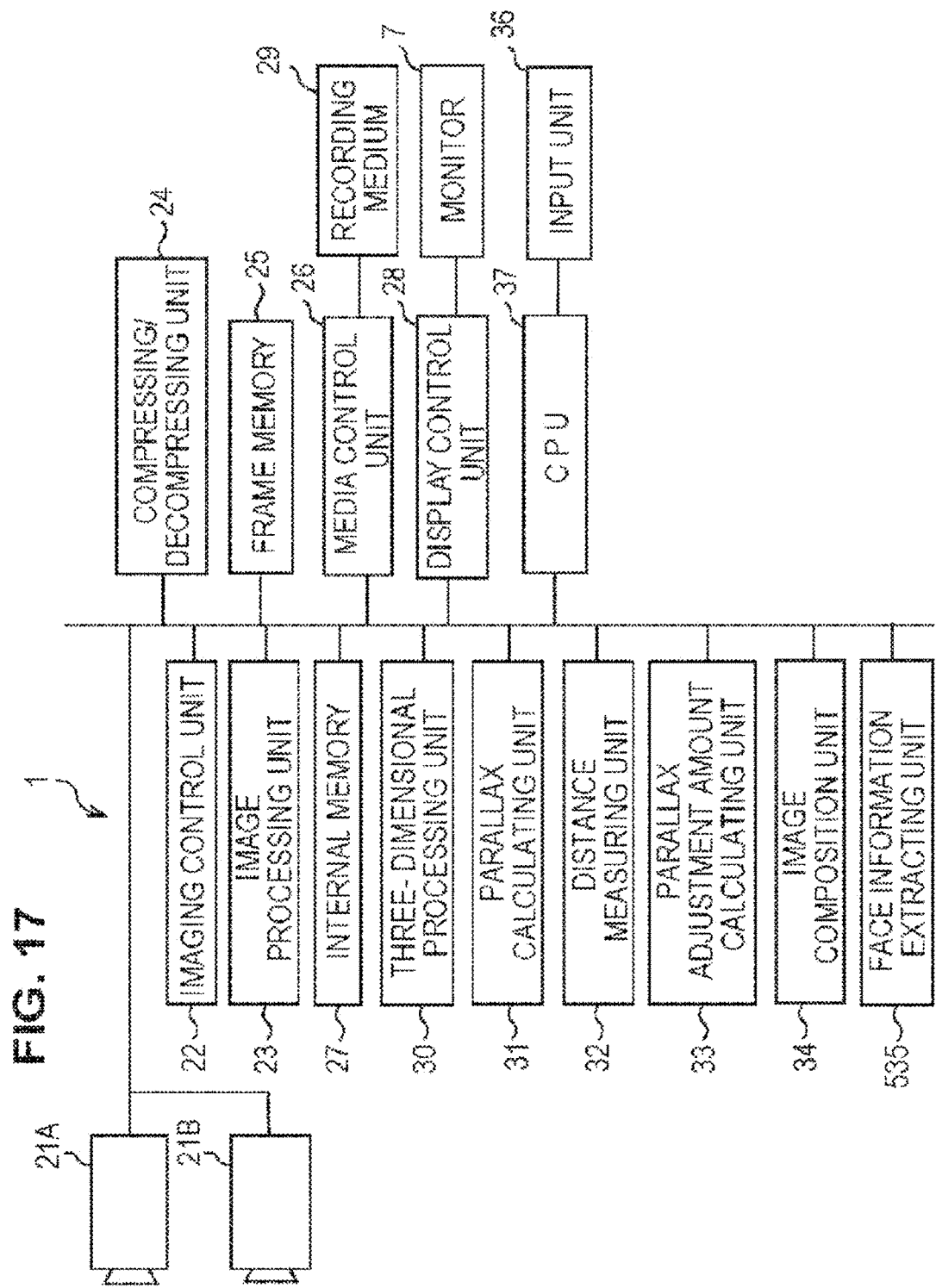
FIG. 17 is a block diagram schematically illustrating the internal structure of a multi-eye digital camera according to a fifth embodiment.

As shown in FIG. 17, a multi-eye digital camera 1 according to the fifth embodiment includes two imaging units 21A and 21B, an imaging control unit 22, an image processing unit 23, a compressing/decompressing unit 24, a frame memory 25, a media control unit 26, an internal memory 27, a display control unit 28, a three-dimensional processing unit 30, a parallax calculating unit 31, a distance measuring unit 32, a parallax adjustment amount determining unit 33, an image combining unit 34, an input unit 36, a CPU 37, and a face information extracting unit 535.

In the panorama imaging mode, the face information extracting unit 535 extracts a region indicating a face from each of a series of left images (or right images) captured in a continuous combination of the single shot modes or the continuous shot mode using a known image recognizing process. In addition, the face information extracting unit 535 counts the number of face regions extracted from each image and records the number of face regions on a face number counter provided for each captured image shown in FIG. 18.

In the panorama imaging mode, the parallax adjustment amount determining unit 33 determines whether the distance to the object is dispersed based on the distance table counter. When it is determined that the distance to the object is dispersed, the parallax adjustment amount determining unit 33 selects a captured image in which the value of the face number counter is equal to or more than 1 and is the minimum from a series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

When the distribution of the distance to the object is concentrated and it is determined that the distance to the object is not dispersed, the parallax adjustment amount determining unit 33 determines whether the value of the distance table counter is concentrated on infinity. When the number of counts of ∞ is equal to or more than a predetermined value and it is determined that the distance to the object is concentrated on infinity, the parallax adjustment amount determining unit 33 does not determine the adjustment amount of the parallax amount when a panorama image is displayed in stereoscopic view and uses the panorama image as a two-dimensional image without any change. On the other hand, when the number of counts of ∞ is less than the predetermined value and it is determined that the distance to the object is not concentrated on infinity, the parallax adjustment amount determining unit 33 selects a captured image in which the distance included in the distance range with the highest frequency of appearance is measured from a series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

Figure 19A:
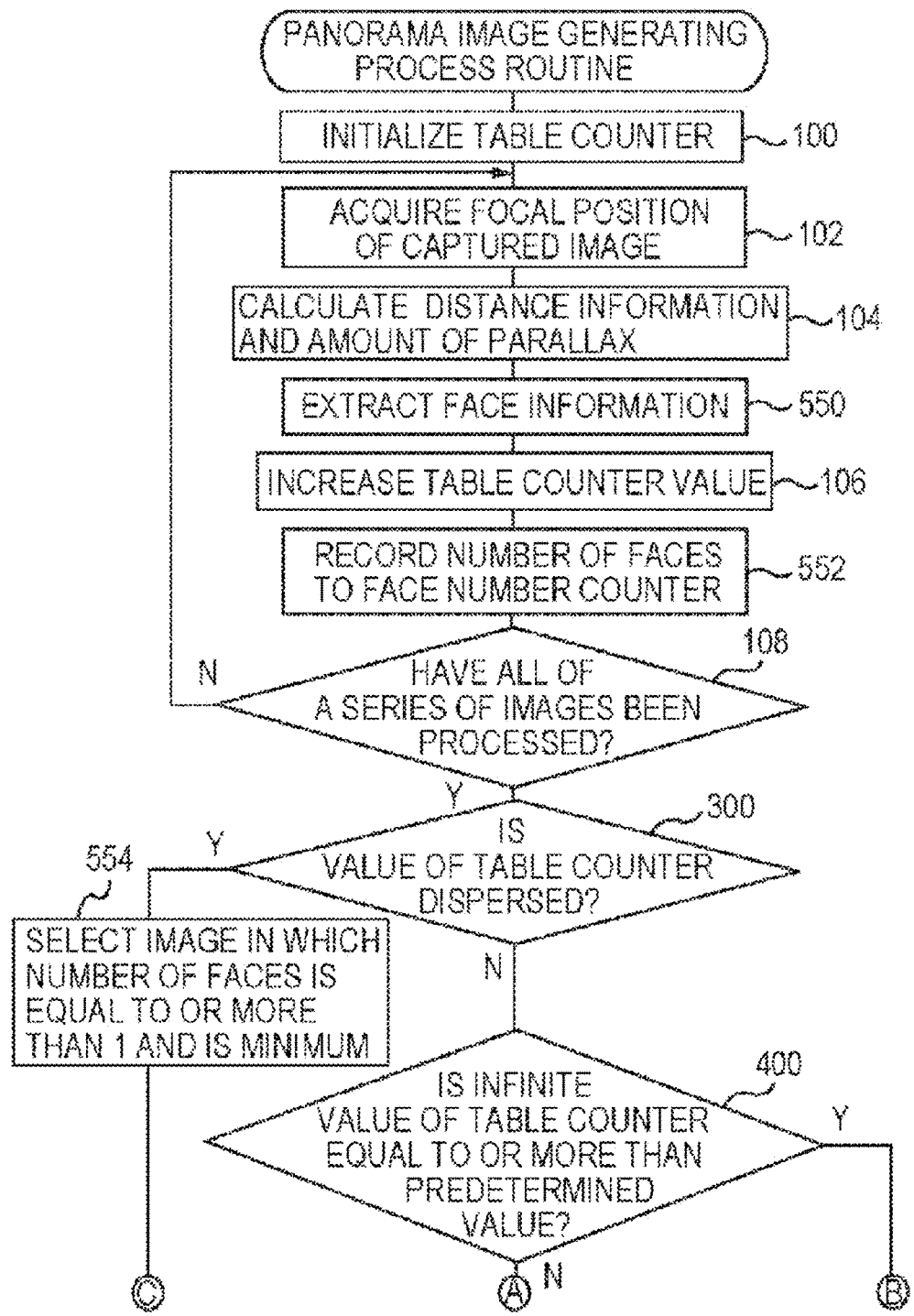
FIGS. 19A and 19B are flowcharts illustrating the content of a panorama image generating process routine according to the fifth embodiment.
Figure 19B:
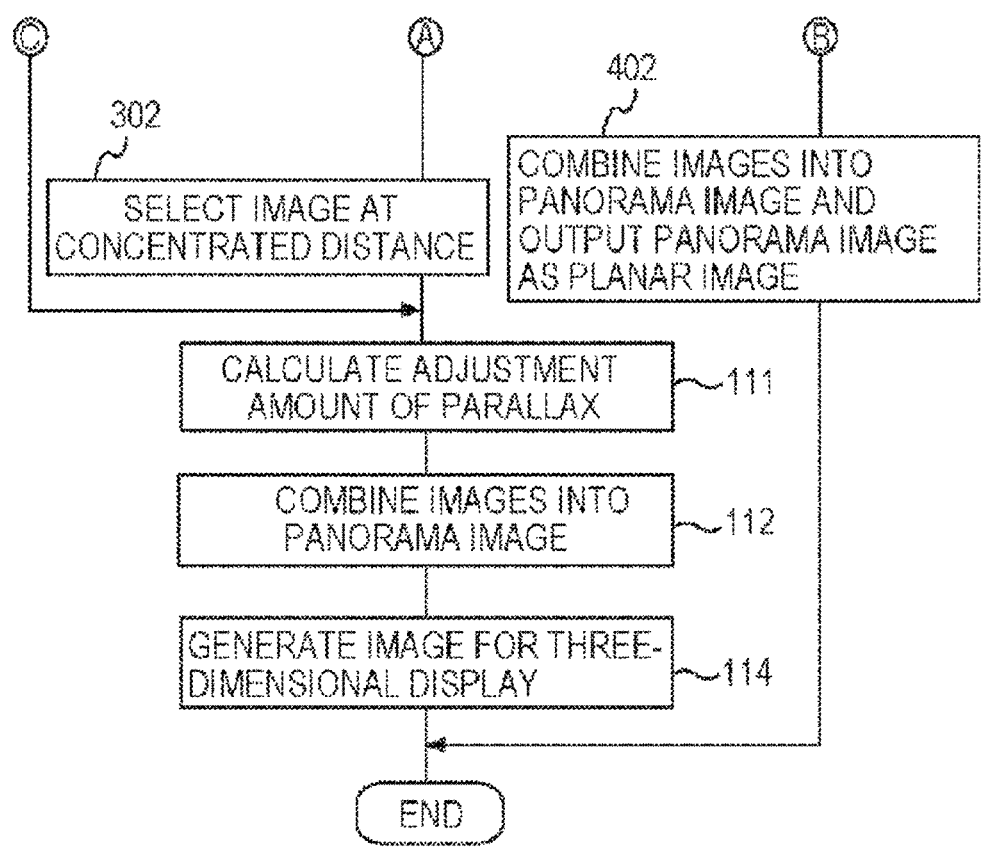

A panorama image generating process routine of the multi-eye digital camera according to the fifth embodiment will be described with reference to FIGS. 19A and 19B. The same steps as those in the panorama image generating process routine according to the above-described embodiments are denoted by the same reference numerals and a description thereof will be omitted.

First, in Step 100, the distance table counter is initialized. In Step 102, for a series of left images (or right images), the focal position of the lens in an object region is acquired. In Step 104, the distance to the object is measured and the adjustment amount of the parallax amount is calculated.

In Step 550, a face region is extracted from a series of left images. In Step 106, in the distance table counter, the count of the distance range including the distance calculated in Step 104 increases. In Step 552, the number of face regions is counted from the extraction result in Step 550 and the count value is recorded on the face number counter corresponding to the image.

In Step 108, it is determined whether Steps 102, 104, 550, 106, and 552 have been performed on all of the series of left images. When it is determined that the steps have been performed on all of the series of left images, the process proceeds to Step 300.

In Step 300, it is determined whether the distance to the object is dispersed from the counter information of the distance table counter. When it is determined that the distance to the object is not dispersed, in Step 400, it is determined whether the number of counts of ∞ is equal to or more than a predetermined value from the counter information of the distance table counter. When it is determined that the number of counts of ∞ is equal to or more than the predetermined value, in Step 402, the series of left images is combined to generate a panorama image and the panorama image is stored as a two-dimensional image in the recording medium 29. Then, the panorama image generating process routine ends.

On the other hand, when it is determined in Step 400 that the number of counts of ∞ is less than the predetermined value, in Step 302, the distance range with the highest frequency of appearance is specified, and a left image in which the distance included in the specified distance range is measured is selected. In addition, the adjustment amount of the parallax amount calculated for the selected left image and the corresponding right image is determined to be the adjustment amount of the parallax amount of the panorama image.

When it is determined in Step 300 that the distance to the object is dispersed, in Step 554, a left image in which the number of faces is equal to or more than 1 and is the minimum is selected based on the face number counter and the adjustment amount of the parallax amount calculated for the selected left image and the corresponding right image is determined to be the adjustment amount of the parallax amount of the panorama image.

In Step 112, a series of left images is combined to generate a panorama image, and a series of right images is combined to generate a panorama image. In Step 114, a panorama image displayed in stereoscopic view is generated from the two panorama images generated in Step 112 based on the adjustment amount of the parallax amount determined in Step 302 or 554 and is then stored in the recording medium 29. Then, the panorama image generating process routine ends.

As described above, according to the multi-eye digital camera of the fifth embodiment, when the focal positions are wholly dispersed in a series of images, the adjustment amount of the parallax amount of an image having a small number of persons is determined to be the adjustment amount of the parallax amount of the entire panorama image. Therefore, it is possible to make a person conspicuous and provide a panorama image with a high effect for displaying in stereoscopic view.

Next, a sixth embodiment will be described. The structure of a multi-eye digital camera according to the sixth embodiment is the same as that of the multi-eye digital camera 1 according to the fifth embodiment. Therefore, the same components as those of the multi-eye digital camera 1 according to the fifth embodiment are denoted by the same reference numerals and a description thereof will be omitted.

The sixth embodiment differs from the fifth embodiment in that a face region is extracted from each of a series of captured images and the size of the face region is also considered to determine the adjustment amount of the parallax amount of the panorama image.

In the panorama imaging mode, the face information extracting unit 535 extracts a region indicating a face from each of a series of left images (or right images) captured in a continuous combination of the single shot modes or the continuous shot mode. In addition, the face information extracting unit 535 counts the number of face regions extracted from each image and records the number of face regions on a face number counter provided for each captured image shown in FIG. 20. The face information extracting unit 535 calculates the size of the face region extracted from each image and stores the frequency of appearance of the face region in a face size counter that is provided for each captured image and indicates the frequency of appearance of each size range.

In the panorama imaging mode, when it is determined that the distance to the object is dispersed based on the distance table counter, the parallax adjustment amount determining unit 33 selects a captured image in which the value of the face number counter is equal to or more than 1 and is the minimum from a series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

When it is determined that the distance to the object is not dispersed and the number of counts of ∞ is equal to or more than a predetermined value for that of the distance to the object, the parallax adjustment amount determining unit 33 determines whether there is an image in which the face region with a size equal to or more than a predetermined size is extracted, based on the face size counter. When it is determined that there is no image in which the face region with a size equal to or more than a predetermined size is extracted, the parallax adjustment amount determining unit 33 does not determine the adjustment amount of the parallax amount when a panorama image is displayed in stereoscopic view and uses the panorama image as a two-dimensional image without any change. On the other hand, when it is determined that there is an image in which the face region with a size equal to or more than a predetermined size is extracted, the parallax adjustment amount determining unit 33 selects the image from a series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

When it is determined that the distance to the object is not dispersed and the number of counts of ∞ is less than the predetermined value for that of the distance to the object, the parallax adjustment amount determining unit 33 selects a captured image in which the distance included in the distance range with the highest frequency of appearance is measured from the series of captured images and determines the adjustment amount of the parallax amount calculated for the corresponding left and right images of the selected captured image by the parallax calculating unit 31 to be the adjustment amount of the parallax amount when a panorama image is displayed in stereoscopic view.

Figure 21B:
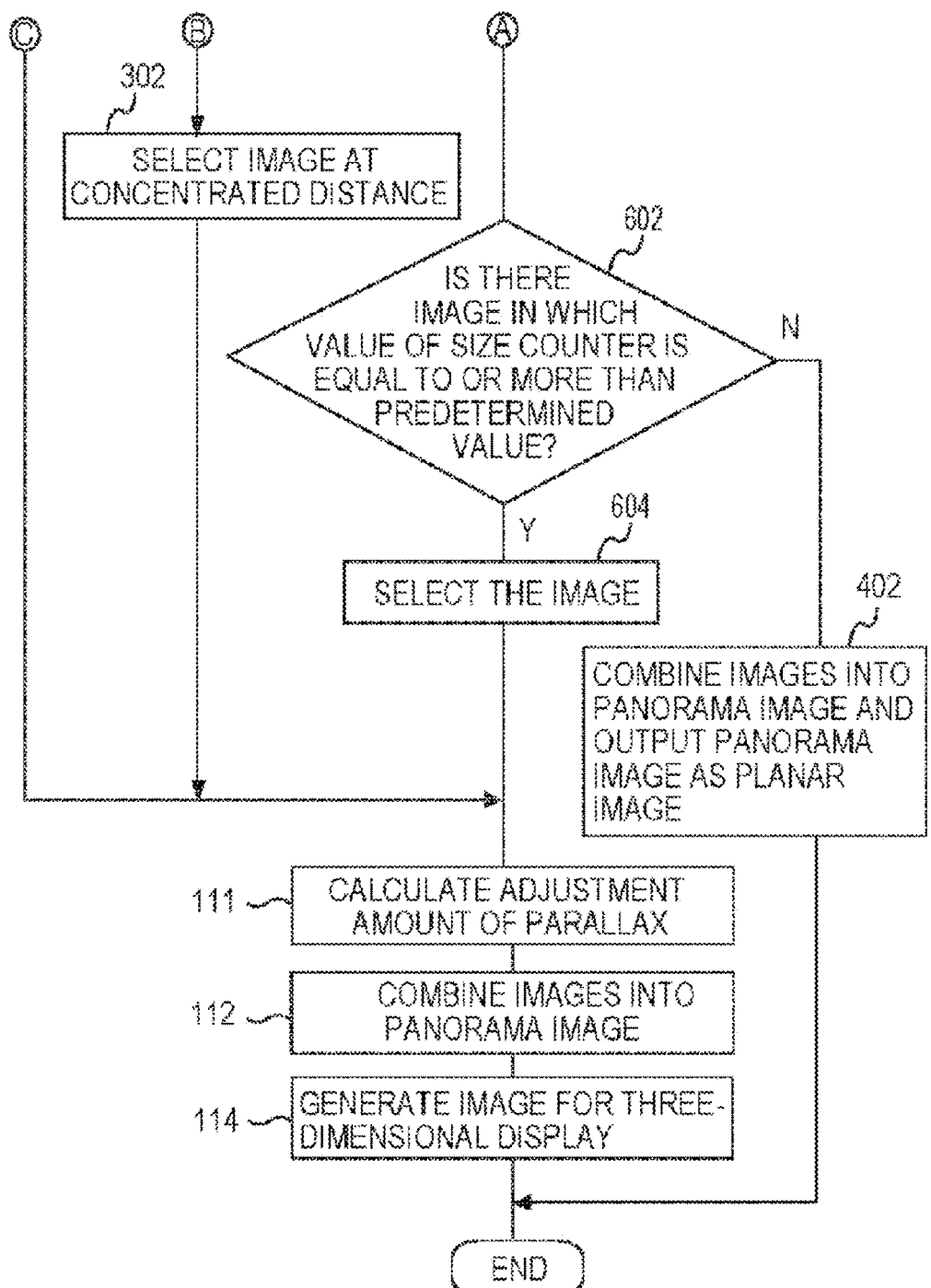

A panorama image generating process routine of the multi-eye digital camera according to the sixth embodiment will be described with reference to FIGS. 21A and 21B. The same steps as those in the panorama image generating process routine according to the above-described embodiments are denoted by the same reference numerals and a description thereof will be omitted.

First, in Step 100, the distance table counter is initialized. In Step 102, for a series of left images (or right images), the focal position of the lens in an object region is acquired. In Step 104, the distance to the object is measured and the adjustment amount of the parallax amount is calculated. In Step 550, a face region is extracted from a series of left images.

In Step 106, in the distance table counter, the count of the distance range including the distance calculated in Step 104 increases. In Step 600, the number of face regions is counted from the extraction result in Step 550 and the count value is recorded to a face number counter corresponding to the image. In addition, in a face size counter corresponding to the image, the size of each face region is calculated and the count in the size range including the calculated size increases.

In Step 108, it is determined whether Steps 102, 104, 550, 106, and 600 have been performed on all of the series of left images. When it is determined that the steps have been performed on all of the series of left images, the process proceeds to Step 300.

In Step 300, it is determined whether the distance to the object is dispersed from the counter information of the distance table counter. When it is determined that the distance to the object is not dispersed, in Step 400, it is determined whether the number of counts of ∞ is equal to or more than a predetermined value from the counter information of the distance table counter. When it is determined that the number of counts of ∞ is equal to or more than the predetermined value, in Step 602, it is determined whether there is a captured image having a face region with a predetermined size or more from the counter information of the face size counter for each captured image. When it is determined that there is a captured image in which a face region is counted in the size range equal to or more than a predetermined size, in Step 604, the left image is selected and the adjustment amount of the parallax amount calculated for the selected left image and the corresponding right image is determined to be the adjustment amount of the parallax amount of a panorama image.

When it is determined in Step 602 that there is no captured image in which a face region is counted in the size range equal to or more than a predetermined size, in Step 402, a series of left images is combined to generate a panorama image and the panorama image is stored as a two-dimensional image in the recording medium 29. Then, the panorama image generating process routine ends.

On the other hand, when it is determined in Step 400 that the number of counts of ∞ is less than the predetermined value, in Step 302, the distance range with the highest frequency of appearance is specified, and a left image in which the distance included in the specified distance range is measured is selected. In addition, the adjustment amount of the parallax amount calculated for the selected left image and the corresponding right image is determined to be the adjustment amount of the parallax amount of the panorama image.

When it is determined in Step 300 that the distance to the object is dispersed, in Step 554, a left image in which the number of faces is equal to or more than 1 and is the minimum is selected based on the face number counter and the adjustment amount of the parallax amount calculated for the selected left image and the corresponding right image is determined to be the adjustment amount of the parallax amount of the panorama image.

In Step 112, a series of left images is combined to generate a panorama image, and a series of right images is combined to generate a panorama image. In Step 114, a panorama image displayed in stereoscopic view is generated from the two panorama images generated in Step 112 based on the adjustment amount of the parallax amount determined in Step 302, 554, or 604 and is then stored in the recording medium 29. Then, the panorama image generating process routine ends.

As described above, according to the multi-eye digital camera of the sixth embodiment, for a series of images, when the camera is focused on infinity, the adjustment amount of the parallax amount of an image in which the size of the face of the person is relatively large is determined to be the adjustment amount of the parallax amount of the entire panorama image. Therefore, it is possible to provide an effective panorama image displayed in stereoscopic view.

In the first to sixth embodiments, the distance from the focal position determined by the AF unit to the object region is measured, but the invention is not limited thereto. The distance to the object region may be measured by the stereo matching of the images obtained from the imaging units 21A and 21B.

The adjustment amount of the parallax amount is calculated for each of a series of captured images, but the invention is not limited thereto. For example, a captured image which is a standard for the adjustment amount of the parallax amount may be selected, the adjustment amount of the parallax amount may be calculated for only the selected captured image, and the calculated adjustment amount may be determined to be the adjustment amount of the parallax amount when a panorama image is displayed in stereoscopic view.

Three or more groups of a series of images may be captured and a panorama image displayed in stereoscopic view may be generated.

The methods of determining the adjustment amount of the parallax amount according to the second to sixth embodiments may be combined with each other. For example, as in the fourth embodiment, it may be determined whether the number of images in which the distance is infinity is equal to or more than a predetermined value. When it is determined that the number of images in which the distance is infinity is equal to or more than the predetermined value, an image displayed in stereoscopic view may not be generated and the image may be used as a two-dimensional image without any change. On the other hand, when it is determined that the number of images in which the distance is infinity is less than the predetermined value, as in the second embodiment, it may be determined whether the distance to the object is entirely distributed in the short range. When it is determined that the distance to the object is distributed in the short range, the adjustment amount of the parallax amount of an image in the shortest range may be set. When it is determined that the distance to the object is not distributed in the short range, as in the third embodiment, it may be determined whether the distance to the object is dispersed. The method of determining the adjustment amount of the parallax amount may be changed according to the determination result.

A routine of a process for capturing an image displayed in stereoscopic view according to the first to sixth embodiments may be programmed and the program may be executed by a CPU.

What is claimed is:

1. An image processing apparatus comprising:
   an acquiring unit that acquires two or more groups of a series of images captured in series from two or more different viewpoints in order to generate a stereoscopic view image for viewing stereoscopically;
   a distance measuring unit that measures a distance to an object for each image of the captured images in series; and
   a parallax adjustment amount calculating unit that determines an adjustment amount of a parallax amount adjusted between one of the series of captured images selected based on a statistical value of the distance measured by the distance measuring unit and another image that is captured from a different viewpoint and corresponds to the captured image to be the adjustment amount of the parallax amount between panorama images when the series of captured images is combined with each other to generate the panorama images in each of the two or more groups,
   wherein the parallax adjustment amount calculating unit determines the adjustment amount of the parallax amount adjusted for the captured image corresponding to the average value of the distance measured for each image of the captured images in series or the captured image in which the distance included in a distance range with the highest frequency of appearance obtained from the distance measured for each image of the captured images in series is measured to be the adjustment amount of the parallax amount between the panorama images.

2. The image processing apparatus according to claim 1, further comprising:
   a face information extracting unit that extracts face information indicating a number of regions indicating faces or sizes of the regions from each image of the captured images in series,
   wherein the parallax adjustment amount calculating unit determines the adjustment amount of the parallax amount adjusted for one of the series of captured images selected based on the statistical value of the distance measured by the distance measuring unit and the face information extracted by the face information extracting unit to be the adjustment amount of the parallax amount between the panorama images.

3. The image processing apparatus according to claim 2,
   wherein, when the distances measured for each image of the captured images in series are not dispersed, the parallax adjustment amount calculating unit selects one of the series of captured images based on the statistical value of the distance,
   when the distances are dispersed, the parallax adjustment amount calculating unit selects one of the series of captured images based on the face information, and
   the parallax adjustment amount calculating unit determines the adjustment amount of the parallax amount adjusted for the selected captured image to be the adjustment amount of the parallax amount between the panorama images.

4. The image processing apparatus according to claim 3,
   wherein, when the distances are dispersed, the parallax adjustment amount calculating unit selects the captured image in which a number of regions indicating the faces is the minimum among the captured images including one or more regions indicating the faces, and determines the adjustment amount of the parallax amount adjusted for the selected captured image to be the adjustment amount of the parallax amount between the panorama images.

5. The image processing apparatus according to claim 3,
   wherein, when the distances are not dispersed and a number of infinite distances is equal to or more than a predetermined value among the distances measured for each image of the captured images in series, the parallax adjustment amount calculating unit selects the captured image in which a size of the region indicating the face is equal to or more than a predetermined value,
   when the distances are not dispersed and the number of infinite distances is less than the predetermined value, the parallax adjustment amount calculating unit selects the captured image in which the distance included in a distance range with the highest frequency of appearance obtained from the distances measured for each image of the captured images in series is measured, and
   the parallax adjustment amount calculating unit determines the adjustment amount of the parallax amount adjusted for the selected captured image to be the adjustment amount of the parallax amount between the panorama images.

6. The image processing apparatus according to claim 1, further comprising:
   a display unit that displays in stereoscopic view the panorama images for the two or more groups based on the adjustment amount of the parallax amount calculated by the parallax adjustment amount calculating unit.

7. The image processing apparatus according to claim 6,
   wherein, when a number of infinite distances is equal to or more than a predetermined value among the distances measured for each image of the captured images in series, the display unit displays the panorama images as two-dimensional images.

8. The image processing apparatus according to claim 6,
   wherein, when displaying each image of the captured images in series in stereoscopic view, the display unit displays the captured image based on the adjustment amount of the parallax amount between the captured image and another captured image that is captured from a different viewpoint and corresponds to the captured image in stereoscopic view.

9. A multi-eye digital camera comprising:
the image processing apparatus according to claim 1; and
imaging units that capture a plurality of images from two or more different viewpoints.

10. An image processing apparatus comprising:
an acquiring unit that acquires two or more groups of a series of images captured in series from two or more different viewpoints in order to generate a stereoscopic view image for viewing stereoscopically;
a distance measuring unit that measures a distance to an object for each image of the captured images in series; and
a parallax adjustment amount calculating unit that determines an adjustment amount of a parallax amount adjusted between one of the series of captured images selected based on a statistical value of the distance measured by the distance measuring unit and another image that is captured from a different viewpoint and corresponds to the captured image to be the adjustment amount of the parallax amount between panorama images when the series of captured images is combined with each other to generate the panorama images in each of the two or more groups,
wherein, when the distances measured for each image of the captured images in series are dispersed, the parallax adjustment amount calculating unit determines a predetermined adjustment amount of the parallax amount to be the adjustment amount of the parallax amount between the panorama images for the two or more groups.

11. The image processing apparatus according to claim 10, wherein, when the distances measured for each image of the captured images in series are not dispersed, the parallax adjustment amount calculating unit determines the adjustment amount of the parallax amount adjusted for the captured image in which the distance included in a distance range with the highest frequency of appearance obtained from the distances measured for each image of the captured images in series is measured to be the adjustment amount of the parallax amount between the panorama images.

12. The image processing apparatus according to claim 10, wherein the predetermined adjustment amount of the parallax amount is determined based on a position where optical axis directions from the two or more viewpoints intersect each other.

13. A non-transitory computer readable recording medium having recorded thereon a program that allows a computer to function as:
an acquiring unit that acquires two or more groups of a series of images captured in series from two or more different viewpoints in order to generate a stereoscopic view image for viewing stereoscopically;
a distance measuring unit that measures a distance to an object for each image of the captured images in series; and a parallax adjustment amount calculating unit that determines the adjustment amount of the parallax amount adjusted between one of the series of captured images selected based on a statistical value of the distance measured by the distance measuring unit and another image that is captured from a different viewpoint and corresponds to the captured image to be the adjustment amount of the parallax amount between panorama images when the series of captured images is combined with each other to generate the panorama images in each of the two or more groups,
wherein the parallax adjustment amount calculating unit determines the adjustment amount of the parallax amount adjusted for the captured image corresponding to the average value of the distance measured for each image of the captured images in series or the captured image in which the distance included in a distance range with the highest frequency of appearance obtained from the distance measured for each image of the captured images in series is measured to be the adjustment amount of the parallax amount between the panorama images.

14. A non-transitory computer readable recording medium having recorded thereon a program that allows a computer to function as:
an acquiring unit that acquires two or more groups of a series of images captured in series from two or more different viewpoints in order to generate a stereoscopic view image for viewing stereoscopically;
a distance measuring unit that measures a distance to an object for each image of the captured images in series; and
a parallax adjustment amount calculating unit that determines an adjustment amount of a parallax amount adjusted between one of the series of captured images selected based on a statistical value of the distance measured by the distance measuring unit and another image that is captured from a different viewpoint and corresponds to the captured image to be the adjustment amount of the parallax amount between panorama images when the series of captured images is combined with each other to generate the panorama images in each of the two or more groups,
wherein, when the distances measured for each image of the captured images in series are dispersed, the parallax adjustment amount calculating unit determines a predetermined adjustment amount of the parallax amount to be the adjustment amount of the parallax amount between the panorama images for the two or more groups.

15. A multi-eye digital camera comprising:
the image processing apparatus according to claim 10; and
imaging units that capture a plurality of images from two or more different viewpoints.

\* \* \* \* \*